United States Patent
Tsutsui

(10) Patent No.: US 6,246,645 B1
(45) Date of Patent: Jun. 12, 2001

(54) AUDIO SIGNAL COMPRESSION METHOD

(75) Inventor: Kyoya Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/609,575

(22) Filed: Jun. 30, 2000

Related U.S. Application Data

(62) Division of application No. 09/275,284, filed on Mar. 24, 1999, now Pat. No. 6,134,202, which is a division of application No. 08/837,706, filed on Apr. 22, 1997, now Pat. No. 6,049,517.

(30) Foreign Application Priority Data

Apr. 30, 1996 (JP) .................................................. 8-109748

(51) Int. Cl.[7] .................................................. G11B 7/00
(52) U.S. Cl. ..................................... 369/44.24; 369/59.13
(58) Field of Search ............................. 369/275.3, 47.24, 369/59.13, 53.13

(56) References Cited

U.S. PATENT DOCUMENTS

| | | | |
|---|---|---|---|
| 4,697,212 | 9/1987 | Osawa et al. | 360/48 |
| 4,815,068 | 3/1989 | Dolby et al. | 369/175 |
| 4,890,273 | 12/1989 | Takeuchi et al. | 369/45 |
| 5,113,293 | 5/1992 | Endo et al. | 360/32 |
| 5,148,330 | 9/1992 | Duurland et al. | 360/40 |
| 5,155,510 | 10/1992 | Beard | 352/27 |
| 5,243,588 | 9/1993 | Maeda et al. | 369/54 |
| 5,388,093 | 2/1995 | Yoshida et al. | 369/124 |
| 5,388,209 | 2/1995 | Akagiri | 395/2.38 |
| 5,490,130 | 2/1996 | Akagiri | 369/124 |
| 5,537,165 | 7/1996 | Miyamori et al. | 352/27 |
| 5,548,574 | 8/1996 | Shimoyoshi et al. | 369/124 |
| 5,579,294 | 11/1996 | Ohta et al. | 369/58 |
| 5,648,954 | 7/1997 | Satoh | 369/275.1 |
| 5,652,783 | 7/1997 | Keba et al. | 370/313 |
| 5,657,309 | 8/1997 | Ebisawa et al. | 369/124 |
| 5,687,157 | 11/1997 | Imai et al. | 369/124 |
| 5,710,590 | 1/1998 | Ichige et al. | 348/14 |
| 5,715,009 | 2/1998 | Tahara et al. | 348/423 |
| 5,717,821 | 2/1998 | Tsutsui et al. | 395/2.14 |
| 5,737,718 | 4/1998 | Tsutsui | 704/205 |
| 5,774,440 | 6/1998 | Kimura et al. | 369/59 |
| 5,901,127 * | 5/1999 | Sako | 369/59 |
| 6,029,136 | 2/2000 | Tsutsui | 704/500 |
| 6,049,517 | 4/2000 | Tsutsui | 369/59 |

FOREIGN PATENT DOCUMENTS

0552903 A2   7/1993 (EP) .

OTHER PUBLICATIONS

M. Krasner, "The Critical Band Coder—Digital Encoding of Speech Signals Based on the Perceptual Requirements of the Auditory System," IEEE, Apr. 1980, vol. 1–3, pp. 327–331.

(List continued on next page.)

*Primary Examiner*—Nabil Hindi
(74) *Attorney, Agent, or Firm*—Sonnenschein, Nath & Rosenthal

(57) ABSTRACT

An information encoding method in which, if desired to reproduce an information recording medium recorded in accordance with an encoding method for a new standard by a reproducing device adapted for coping with the encoding method for an old standard, the user is apprised of the fact that part of the recorded signals cannot be reproduced by a reproducing device adapted for coping only with the encoding method for the old standard. For encoding the information in accordance with the encoding method for the new standard, the message information in addresses 200000 to 239999 is encoded simultaneously. The message information has been encoded in accordance with the encoding method for the old standard and which can be reproduced by the reproducing device adapted for coping with the encoding method for the old standard.

6 Claims, 14 Drawing Sheets

OTHER PUBLICATIONS

R. Zelinski et al., "Adaptive Transform Coding of Speech Signals," IEEE Transactions on Acoustics, Speech & Signal Processing, vol. ASSP–25, No. 4, Aug. 1977, pp. 299–309.

J. Princen et al., "Subband/Transform Coding Using Filter Bank Designs Based on Time Domain Aliasing Cancellation," ICASSP, Apr. 6–9, 1987, vol. 4, pp. 2161–2164.

J. Rothweiler, "Polyphase Quadrature Filters—A New Subband Coding Technique," ICASSP, Apr. 14–16, 1983, vol. 3 of 3, pp. 1280–1283.

R. Crochiere et al., "Digital Coding of Speech in Sub–Bands," The Bell System Technical Journal, vol. 55, No. 8, Oct. 1976, pp. 1069–1085.

D. Huffman, "A Method for the Construction of Minimum–Redundancy Codes," Proceedings of the I.R.E., Jan. 1952, vol. 40, No. 1, pp. 1098–1101.

ISO/IEC 11172–3 International Standard, Information Technology–Coding of Moving Pictures and Associated Audio for Digital Storage Media at up to About 1,5 Mbit/S–Part 3: Audio, Aug. 1993, pp. 1–150.

* cited by examiner

AUDIO SIGNAL COMPRESSION METHOD

This is a divisional of application Ser. No. 09/275,284, filed Mar. 24, 1999 now U.S. Pat. No. 6,134,202, which is a divisional of application Ser. No. 08/837,706, filed Apr. 22, 1997 now U.S. Pat. No. 6,049,517.

BACKGROUND OF THE INVENTION

1. Field of the Invention

This invention relates to an information encoding method for encoding the information, an associated information decoding apparatus and an information recording medium having the encoded information recorded thereon.

2. Description of the Related Art

As what can record the encoded acoustic information or the encoded speech information, referred to herein as audio signals, an information recording medium, such as a magneto-optical disc, has so far been proposed. A variety of high-efficiency encoding techniques exist for encoding audio or speech signals. Examples of these techniques include so-called transform coding as a blocking frequency spectrum splitting system and a so-called sub-band coding system (SBC) as a non-blocking frequency spectrum splitting system. In the transform coding, audio signals on the time axis are blocked every pre-set time interval, the blocked time-domain signals are transformed into signals on the frequency axis, and the resulting frequency-domain signals are encoded from band to band. In the sub-band coding system, the audio signals on the time axis are split into plural frequency bands and encoded without blocking. In a combination of the sub-band coding system and the transform coding system, the audio signals on the time axis are split into plural frequency bands by the sub-band coding system, and the resulting band-based signals are transformed into frequency-domain signals by orthogonal transform for encoding.

As band-splitting filters used in the sub-band coding system, there is a so-called quadrature mirror filter (QMF) discussed in R. E. Crochiere, "Digital Coding of Speech in Sub-bands", Bell Syst. Tech. J., Vol. 55, No. 8, 1976. This QMF filter divides the frequency spectrum in two bands of equal bandwidths. With the QMF filter, so-called aliasing is not produced on subsequent synthesis of the band-split signals. The technique of splitting the frequency spectrum into equal frequency bands is discussed in Joseph H. Rothweiler, Polyphase Quadrature Filters—A New Subband Coding Technique", ICASSP 83 BOSTON. With the polyphase quadrature filter, the signal can be split at a time into plural frequency bands of equal bandwidths.

Among the techniques for orthogonal transform, there is known such a technique in which the input audio signal is split into frames of a predetermined time duration and the resulting frames are processed by discrete Fourier transform (DFT), discrete cosine transform (DCT) or modified DCT (MDCT) to convert the signals from the time axis to the frequency axis. Discussions of a MDCT may be found in J. P. Princen and A. B. Bradley, "Subband/Transform Coding Using Filter Bank Based on Time Domain Aliasing Cancellation", ICASSP 1987.

If the above-mentioned DFT or DCT is used as a method for orthogonal transform of waveform signals, using a time block made up of M samples, M independent real-number data are obtained. For reducing the junction distortion between these time blocks, M1 sample data each are usually overlapped between both neighboring time blocks. Thus, in DFT or DCT, M real-number data are obtained on an average for (M–M1) sample data, so that these M real-number data are subsequently quantized and encoded.

Conversely, if the above-mentioned MDCT is used as the method for method for orthogonal transform, M independent real-number data are obtained from 2M samples obtained on overlapping M sample data between two neighboring time blocks. That is, if MDCT is used, M real-number data are obtained for M sample data on an average, these M real-number data being then quantized and encoded. In the decoding apparatus, waveform elements obtained on inverse transform in each block are summed together with interference to re-construct the waveform signals.

Meanwhile, if the time block for orthogonal transform is lengthened, the frequency resolution is increased, with the result that the signal energy is concentrated in specified spectral signal components. Thus, with the MDCT in which orthogonal transform is carried out using a long time block obtained on overlapping one-half sample data between both neighboring time blocks, and in which the number of the spectral signal components is not increased as compared the number of the original time-domain sample data, a higher encoding efficiency can be realized than if the DFT or DCT is used. Morever, if neighboring time blocks are overlapped with each other with a sufficiently long overlap, junction distortion between time blocks of waveform signals can be reduced.

By quantizing signal components split from band to band by a filter or orthogonal transform, it becomes possible to control the band subjected to quantization noise, thus enabling encoding with perceptually higher encoding efficiency by exploiting masking effects. By normalizing respective sample data with the maximum value of the absolute values of the signal components in each band prior to quantization, the encoding efficiency can be improved further.

As the band splitting width used for quantizing the signal components resulting from splitting of the frequency spectrum of the audio signals, the band width taking into account the psychoacoustic characteristics of the human being is preferably used. That is, it is preferred to divide the frequency spectrum of the audio signals into a plurality of, for example, 25, critical bands. The width of the critical bands increases with increasing frequency. In encoding the band-based data in such case, bits are fixedly or adaptively allocated among the various critical bands. For example, when applying adaptive bit allocation to the special coefficient data resulting from a MDCT, the spectra coefficient data generated by the MDCT within each of the critical bands is quantized using an adaptively allocated number of bits. The following two techniques are known as the bit allocation technique.

In R. Zelinsky and P. Noll, "Adaptive transform Coding of Speech Signals", IEEE Transactions of Acoustics, Speech and Signal processing", vol. ASSP-25, August 1977, bit allocation is carried out on the basis of the amplitude of the signal in each critical band. This technique produces a flat quantization spectrum And minimizes noise energy, but the noise level perceived by the listener is not optimum because the technique does not exploit the psychoacoustic masking effect.

In M. A. Krassener, "The Critical Band Coder—Digital Encoding of the Perceptual Requirements of the Auditory System", MIT, ICASSP 1980, there is described a technique in which the psychoacoustic masking effect is used to determine a fixed bit allocation that produces the necessary bit allocation for each critical band. However, with this technique, since the bit allocation is fixed, non-optimum results are obtained even for a strongly tonal signal such as a sine wave.

For overcoming this problem, it has been proposed to divide the bits that may be used for bit allocation into a fixed pattern allocation fixed for each band or each small block subdivided from the band and a bit allocation portion dependent on the amplitude of the signal in each block. The division ratio is set depending on a signal related to the input signal such that the division ratio for the fixed allocation pattern portion becomes higher the smoother the pattern of the signal spectrum.

With this method, if the audio signal has high energy concentration in a specified spectral signal component, as in the case of a sine wave, abundant bits are allocated to a block containing the signal spectral component for significantly improving the signal-to-noise ratio as a whole. In general, the hearing sense of the human being is highly sensitive to a signal having sharp spectral signal components, so that, if the signal-to-noise ratio is improved by using this method, not only the numerical values as measured can be improved, but also the audio signal as heard may be improved in quality.

Various other bit allocation methods have been proposed and the perceptual models have become refined, such that, if the encoding device is of high ability, a perceptually higher encoding efficiency may be achieved.

With these methods, the usual practice is to find a real-number bit allocation reference value which will realize the theoretical S/N ratio as faithfully as possible and to use an integer approximating it as an allocated number of bits.

In the U.S. patent application Ser. No. 08/374,518 by the present Assignee, there is proposed a method of separating perceptually crucial tonal components from spectral signal components and encoding these tonal components separately from the other spectral components. This assures efficient encoding of the audio signals with a high compression ratio without substantially producing perceptual deterioration.

For constructing an actual codestring, it suffices if the quantization fineness information and the normalization coefficient information are encoded with a pre-set number of bits for each band for which normalization and quantization are performed and to encode the normalized and quantized spectral signal components. In the ISO standard (ISO/IEC 11172-3:1993 (E), a993), there is described a high-efficiency method in which the number of bits representing the quantization fineness information is set so as to be different from band to band. The number of bits representing the quantization fineness information is set so as to be smaller with increased frequency.

There is also known a method in which the quantization fineness information is determined from, for example, the normalization coefficient information in the decoding device instead of directly encoding the quantization fineness information. However, since the relation between the normalization coefficient information and the quantization fineness information is determined with this method on setting the standard, quantization fineness control based on an advanced perceptual model cannot be introduced in future. Moreover, if there is a width in the compression rate to be realized, it becomes necessary to set the relation between the normalization coefficient information and the quantization fineness information from one compression rate to another.

There is also known a method of encoding the quantized spectral signal components more efficiently by using variable length code for encoding as discussed in D. A. Huffman, Proc. I. R. E., 40, p. 1098 (1952), "A Method for Construction of Minimum redundancy Codes".

The above are merely illustrative examples of the methods for raising the encoding efficiency, which are being developed one after another. Therefore, if the standard which has incorporated the newly developed method, recording of longer time duration or recording of audio signals with higher quality for the same recording time becomes possible.

In determining the above-described standard, a method is used in which there is room left for recording the flag information concerning the standard on the information recording medium in preparation for future standard modification or expansion. For example, on initial standardization, '0' is recorded as a 1-bit flag information and, in case of standard modification, '1' is recorded as the flag information. The reproducing device conforming to the modified standard checks if the flag information is '0' or '1' and, if the flag information is '1', signals are read out and reproduced from the information recording medium. If the flag information is '0', and the reproducing device also conforms to the initially determined standard, the signals are read out and reproduced from the information recording medium based on this standard. If otherwise, the signals are not reproduced.

The above-described conventional information encoding method is carried out on an information encoding and/or decoding device (compressed data recording and/or reproducing device, referred to herein simply as a recording/reproducing device) shown for example in FIG. 1.

The recording/reproducing device uses, as an information recording medium, a magneto-optical disc 1, which is run in rotation by a spindle motor 51. During data recording on the magneto-optical disc 1, a modulated magnetic field corresponding to the recording data is applied from the magnetic head 54 while the laser light is radiated from the optical head 53 for recording, that is for recording by magnetic field modulation, thereby recording data along a recording track of the magneto-optical disc 1. for reproducing data from the magneto-optical disc 1, the recording track of the disc 1 is traced by the optical head 53 and changes caused in the direction of polarization of the reflected laser light from the magneto-optical disc 1 are detected for photomagnetic reproduction.

The optical head 53 is made up of optical components, such as a laser light source, for example, a laser diode, a collimator lens, an objective lens, a polarization beam splitter or a cylindrica lens, and a photodetector having light-receiving segments of a pre-set pattern. The optical head 53 is provided facing the magnetic head 54 with the magneto-optical disc 1 in-between. For recording data on the magneto-optical disc 1, the magnetic head 54 is driven by a head driving circuit 66 of a recording system, as later explained, for applying a modulated magnetic field corresponding to the recording data, at the same time as the laser light is radiated on a target track of the magneto-optical disc 1, by way of performing thermo-magnetic recording in accordance with the magnetic field modulation system. In addition, the optical head 53 detects the reflected laser light from the target track for detecting focusing error signals and tracking error signals by the astigmatic method and by the push-pull method, respectively. For reproducing data from the magneto-optical disc 1, the optical head 53 detects the focusing error signals and tracking error signals while also detecting difference in the angle of polarization (Kerr rotation) of the reflected light from the target track of the laser light for generating the playback signals.

An output of the optical head 53 is sent to an RF circuit 55, which then extracts the focusing error signals and tracking error signals from the output of the optical head 53 to send the extracted signals to a servo control circuit 56 while converting the playback signals into bi-level signals and routing the bi-level signals to a decoder 71 of a reproducing system as later explained.

The servo control circuit 56 is made up of, for example, a focusing servo circuit, a tracking servo circuit, a spindle motor servo control circuit and a thread servo control circuit. The focusing servo circuit focusing-controls the optical system of the optical head 53 so that the focusing error signal will be zero. The tracking servo circuit tracking-controls the optical system of the optical head 53 so that the tracking error signal will be zero. The spindle motor servo control circuit controls the spindle motor 51 for rotationally driving the magneto-optical disc 1 to rotate at a pre-set rotational velocity, such as constant linear velocity. The thread servo control circuit moves the optical head 53 and the magnetic head 54 to a target track position of the magneto-optical disc 1 designated by a system controller 57. The servo control circuit 56, performing these various control operations, sends to the system controller 57 the information specifying the operating states of various components controlled by the servo control circuit 56.

To the system controller 57 are connected a key input unit 58 and a display 59. The system controller 57 controls the recording system and the reproducing system by the operating input information by the key input unit 58. The system controller 57 also controls the recording position or the reproducing position on the recording track traced by the optical head 53 and the magnetic head 54 based on the sector-based address information read out from the recording track of the magneto-optical disc 1, such as the header time or the abb-code Q-data. The system controller 57 also causes the reproducing time to be displayed on the display 59 based on the data compression rate by the recording/reproducing device and the reproducing position information on the recording track.

For this reproducing time display, the sector-based address information reproduced from the recording track of the magneto-optical disc 1 by, for example, the header time or the sub-code Q data (absolute time information), is multiplied by the reciprocal of the data compression rate, such as 4 in case of 1/4 compression, to find the actual time information, which is displayed on the display 59. During recording, if the absolute time information is recorded (pre-formatted) on the recording track of, for example, a magneto-optical disc, this pre-formatted absolute time information may be read and multiplied by a reciprocal of the data compression rate for displaying the current position in terms of the actual recording time.

In the recording system of the recording/reproducing device, an analog audio input signal Ain from an input terminal 60 is fed via a low-pass filter 61 to an analog/digital (A/D) converter 62 which then quantizes the analog audio input signal Ain. On the other hand, a digital audio input signal Din from an input terminal 67 is supplied via a digital input interfacing circuit 68 to an ATC encoder 63. The ATC encoder 63 performs bit compression (data compression) associated with a pre-set data compression rate on digital audio PCM data of a pre-set transfer rate corresponding to the input signal Ain quantized by the A/D converter 62. The compressed data outputted by the ATC encoder 63 (ATC data) is routed to a memory (RAM) 64. If the data compression rate is 1/8, the data transfer rate in this area is reduced to one-eighth of the data transfer rate of the standard format (CD-DA format) of 75 sectors/second, or to 9.375 sectors/second.

The memory 64 has its data writing and data readout controlled by the system controller 57, and is used for temporarily storing the ATC date supplied from the ATC encoder 63 for recording on the disc when the necessity arises. That is, for the data compression rate of, for example, 1/8, the compressed audio data supplied from the ATC encoder 63 has its data transfer rate reduced to one-eighth of the data transfer rate of the standard CD-DA format of 75 sectors/second, or to 9.375 sectors/second. It is this compressed data that is continuously recorded on the memory 64. It is sufficient to record one of eight sectors, as explained previously. However, since the recording of every eight sector is virtually impossible, sector-continuous recording is performed, as will be explained subsequently.

This recording is done in a burst fashion, that is intermittently, at a data transfer rate equal to that of the standard CD-DA format or 75 sectors/second, with a 'cluster' as a recording unit with the interposition of a non-recoding period. The cluster is comprised of a pre-set plural number of sectors, such as 32, and several sectors each ahead and at back of the cluster. That is, in the memory 64, the ATC audio data, with the data compression rate of 1/8, continuously written at a low transfer rate of 9.375 (=75/8) sectors/second conforming to the above bit compression rate, is read out in a burst fashion as the recording data at the above-mentioned transfer rate of 75 sectors/second. The overall data transfer rate of the read-out and recorded data, inclusive of the non-recording period, is the above-mentioned low rate of 9.375 sectors/second. However, the instantaneous data transfer rate within the burst-like recording time is the above-mentioned instantaneous rate of 75 sectors/second. Therefore, if the rotational velocity of the disc is the same as the velocity of the standard CD-DA format (constant linear velocity), the recording performed is of the same recording density and the same storage pattern as those of the CD-DA format.

The ATC audio data read out in a burst fashion from the memory 64 at the transfer rate (instantaneous transfer rate) of 75 sectors/second, that is recording data, is sent to an encoder 65. In the data string supplied from the memory 64 to the encoder 65, the unit of continuous recording by one recording is the 'cluster' made up of a plurality of, for example, 32, sectors, and several cluster-connecting sectors arrayed before and after the 'cluster'. This cluster connecting sector is set so as to be longer than the interleaving length in the encoder 65 so that interleaving cannot affect data of other clusters.

The encoder 65 performs error correction processing, that is parity appendage, interleaving or EFM encoding, on the recording data supplied thereto in a burst fashion as described above. It is this recording data, thus processed by the encoder 65, that is routed to a magnetic head driving circuit 66. The magnetic head 54 is connected to this magnetic head driving circuit 66 which drives the magnetic head 54 for applying the modulated magnetic field corresponding to the recording data to the magneto-optical disc 1.

The system controller 57, controlling the memory 64 as described above, also controls the recording position so that the recording data read out in the burst fashion from the memory 64 will be continuously recorded on the recording track of the magneto-optical disc 1. The recording position is controlled by managing the recording position of the recording data read out in the burst fashion from the memory 64 by the system controller 57 for supplying a control signal designating the recording position on the recording track of the magneto-optical disc 1 to the servo control circuit 56.

The reproducing system is hereinafter explained. This reproducing system is designed for reproducing recording data continuously recorded on the recording track of the magneto-optical disc 1 by the above recording system, and includes a decoder 71 fed from the RF circuit 55 with a bi-level version of the playback output obtained on tracing the recording track of the magneto-optical disc 1 by the laser light by the optical head 53. This reproducing system can read out information signals from not only the magneto-optical disc 1 but also from a read-only optical disc such as a Compact Disc (trade mark).

The decoder 71 is a counterpart device of the encoder 65 of the above-described recording system. Specifically, the decoder processes the bi-level playback output from the RF circuit 55 such as with the above-mentioned decoding for error correction of EFM decoding, and reproduces the ATC audio data having the data compression rate of 1/8 at a transfer rate of 75 sectors/second which is faster than the regular transfer rate. The playback data, obtained by the decoder 71, is routed to a memory (RAM) 72.

The memory 72 has data writing and data readout controlled by the controller 57, such that the playback data supplied from the decoder 71 at the transfer rate of 75 sectors/second is written therein in a burst fashion at the same transfer rate of 75 sectors/second. The playback data, written in the memory 75 at the transfer rate of 75 sectors/second, is continuously read out from the memory 72 at a transfer rate of 9.375 sectors/second corresponding to the data compression rate of 1/8.

The system controller 57 performs memory control of writing the playback data in a burst fashion in the memory 72 at the transfer rate of 75 sectors/second and continuously reading out the playback data written in a burst fashion in the memory 72 by this memory control from the recording track of the magneto-optical disc 1. In addition to performing the above-mentioned memory control for the memory 72, the system controller 57 performs playback position control of continuously reproducing the playback data written in a burst fashion in the memory 72 by this memory control from the recording track of the magneto-optical disc 1. The playback position is controlled by the system controller 57 managing the playback position for the playback data read out in a burst fashion from the magneto-optical disc 1 for supplying a control signal designating the playback position on the recording track of the magneto-optical disc 1 or the optical disc to the servo control circuit 56.

The ATC audio data, obtained as playback data continuously read out at the transfer rate of 9.375 sectors/second, are routed to an ATC decoder 73. The ATC decoder 73 can cope with both the A-coded and the B-codec. This ATC decoder 73 is a counterpart, of the ATC encoder 63 of the recording system and reproduces the 16-bit digital audio data by 8-fold data expansion (bit expansion) of the ATC data. The digital audio data from the ATC decoder 73 is routed to a digital/analog (D/A) converter 74.

The D/A converter 74 converts digital audio data supplied from the ATC decoder 73 into analog signals for forming analog audio output signals Aout. The analog audio output signals Aout, thus obtained from the D/A converter 74, are outputted via low-pass filter 75 at an output terminal 76.

However, if a reproducing device capable of reproducing only signals recorded by a pre-set standard, referred to herein as 'old standard' or 'first encoding method', comes into widespread use, this type of the reproducing device, referred to herein as a 'reproducing device conforming to the old standard', cannot reproduce an information recording medium recorded with an upper order standard employing a higher efficiency encoding system, thus inconveniencing the user of the device. The upper order standard is referred to herein as a 'new standard' or 'a second encoding method'. In particular, in certain reproducing devices developed at the time point of formulation of the old standard, the flag information recorded on the information recording medium is disregarded and the signals recorded on the information recording medium are reproduced on the assumption that these signals are all recorded by the old standard. That is, if the information is recorded on an information recording medium in accordance with the new standard, it is not all reproducing devices conforming to the old standard that can recognize it. Thus, if the reproducing devices conforming to the old standard construes the information recording medium having recorded thereon signals conforming to the new standard as being an information recording medium having recorded thereon signals conforming to the old standard and proceeds to reproduction, it may be an occurrence that the device cannot operate regularly, or generates objectionable noise.

FIG. 2 shows a conventional formatting example in case of recording signals encoded as described above on a magneto-optical disc. In the example of FIG. 2, it is assumed that four audio signal data (four musical numbers) have been recorded on the disc.

In FIG. 2, not only the four audio signal data but also the management data used for recording/reproducing the audio signal data are recorded on the disc. In an address 0 and an address 1 of the management data area, a leading data number and a trailing data number are recorded, respectively. In the example of FIG. 2, 1 and 4 are recorded as the value of the leading data number and the trailing data number, respectively. This indicates that four audio signal data of from number 1 to number 4 have been recorded on the disc.

In the addresses 5 to 8 of the management data area, there is recorded the information on the address storage positions specifying in which portion of the management data area 'data specifying in which portion of the disc each audio signal data is recorded', that is the address information, is recorded. The information on the address storage position is recorded in the sequence of the audio signal data, that is in the number playing sequence, such that the information on the address storage position for audio signal data played first is stored in the address 5, while the information on the address storage position for audio signal data played second is stored in the address 6, and so forth. By using this management data, the reproducing sequence for the first number and the second number can be easily realized by exchanging the contents of the addresses 5 and 6 instead of by exchanging the actual recording positions of the audio signal data. In the management data area is reserved a spare area, stuffed with 0s, for enabling future expansion.

It is assumed that a certain encoding method, referred to herein as A codec, is developed, a recording format for a disc is standardized using this encoding method, and that later an encoding method of a higher efficiency, representing the expansion of the A-codec, referred to herein as a B-codec, has been developed. In such case, the signals encoded by the B-codec can be recorded on the same sort of the disc as that on which signals by the A-codec are recorded. If the signals by the B-codec can be recorded similarly to those by the A-codec, signals can be recorded for a longer time on the disc, or to a higher signal quality, thus conveniently expanding the field of application of the disc.

For recording on the disc the signals encoded by the B-codec representing expansion of the A-codec the mode designation information shown in FIG. 3 is recorded in the address 2 set as the spare area on a disc designed to cope with only the old standard (A-codec) shown in FIG. 2. The mode designation information '0' specifies that recording is made in accordance with the old standard, while the mode designation information '0' specifies that recording is made in accordance with the new standard (B-codec). Thus, if the mode designation information is '1' during disc reproduction, it is seen that the recording according to the new standard, that is recording by the B-codec, has been done on the disc.

In addition, if the signals by the B-codec are recorded on the disc, one of the spare areas formed next to the area for recording the address information (start and end addresses) of each audio signal data as shown in FIG. 2 is used as the area for the codec designation information. The codec designation information of '0' specifies that the audio signal data specified by the address information made up of the start and end addresses has been encoded in accordance with the old standard, while the codec designation information of '1' specifies that the audio signal data specified by the address information has been encoded in accordance with the new standard (B-codec).

In this manner, audio signal data encoded by the A-codec can be recorded on the same disc so as to co-exist with that encoded by the B-codec such that the disc can be reproduced by a reproducing device designed to cope with the new standard.

However, with the above disc, it cannot be discriminated from the appearance whether the recording has been done in accordance with the old standard or the new standard. Thus there is a risk for the user to reproduce the disc with a reproducing device designed to cope with only the old standard. At this time, if the reproducing device is designed for reproducing all of the recorded signals on the assumption that these recorded signals are encoded in accordance with the old standard, the reproducing device attempts to reproduce the signals on the assumption that the recorded signals have been encoded in accordance with the A-codec without attempting to check the address 2 set to 0 at all times in the old standard. Thus the risk is high that the disc cannot be reproduced or random or haphazard noise is produced thus inconveniencing the user.

SUMMARY OF THE INVENTION

It is therefore an object of the present invention to provide an information encoding method for encoding the information, an associated information decoding apparatus and an information recording medium in which data that cannot be reproduced by the reproducing device designed to cope with the old standard is not erroneously reproduced, and in which a message advising the user of the contents of the information recording medium is transmitted to the user for preventing the user of the reproducing device designed to cope with the old standard from being annoyed.

It is another object of the present invention to provide an information encoding method for encoding the information, an associated information decoding apparatus and an information recording medium in which means for recording the encoded information on the information recording medium can be constructed at low costs and in which it is possible to advise the reproducing means designed to cope with the old standard which items of the information recorded on the information recording medium has been recorded in accordance with the new standard.

In an information encoding method according to the present invention, when the information is encoded in accordance with a second encoding method which cannot be carried out by reproducing means adapted for coping only with a first encoding method, the message information is encoded in accordance with the first encoding method.

In an information decoding apparatus according to the present invention, there is provided reproducing means for reproducing, in an optional designated sequence, the information encoded in accordance with the first encoding method and the information encoded in accordance with the second encoding method that cannot be carried out by reproducing means adapted for coping only with the first encoding method.

An information recording medium according to the present invention has recorded thereon the information encoded in accordance with the second encoding method that cannot be carried out by the reproducing means adapted for coping only with the first encoding method and the message information encoded in accordance with the first encoding method.

Thus, according to the present invention, if it is desired to encode the information by the second encoding method (encoding method for the new standard) and to record the encoded information on the information recording medium, a message signal for advising the user of the fact that a portion of the signal recorded on the information recording medium cannot be reproduced by reproducing means adapted for coping only with the first encoding method (encoding method of the old standard) is encoded by the first encoding method and recorded on the information recording medium. On the other hand, if the information is reproduced by the reproducing means adapted for coping with the first encoding method, the information other than the information encoded based on the first encoding method is adapted for not being reproduced for preventing the user from being distressed or preventing the noise from being produced.

An information encoding method for encoding the information in accordance with the second encoding method that cannot be reproduced by reproducing means adapted for coping only with the first encoding method includes generating the management information including the arraying position of the message information encoded by the first encoding method and which can be reproduced by the first encoding method.

An information decoding apparatus according to the present invention includes reproducing means for selecting and decoding the information encoded in accordance with the second encoding method when reproducing the information encoded in accordance with the second encoding method and which cannot be reproduced by reproducing means adapted for coping only with the first encoding means based on the management information including the arraying position of the message information encoded with the first encoding method.

An information recording medium according to the present invention has recorded thereon the message information encoded in accordance with the first encoding method and which can be reproduced by reproducing means adapted for coping with the first encoding method.

That is, according to the present invention, the message information encoded in accordance with the first encoding method (encoding method of the old standard) is prerecorded on the recording medium. When encoding the information by the second encoding method (encoding method of the signal standard) and recording the encoded information on the recording medium, the contents of the management information are acted upon so that, when the recording medium is reproduced by the reproducing means adapted for coping with the first encoding method, the message information is adapted for being reproduced in association with the information recorded on being encoded by the second encoding method, in order to apprize the user of the reproducing means adapted for coping with the first encoding method which information has actually been recorded by the first encoding method.

DESCRIPTION OF THE PREFERRED EMBODIMENTS

Figure 1:
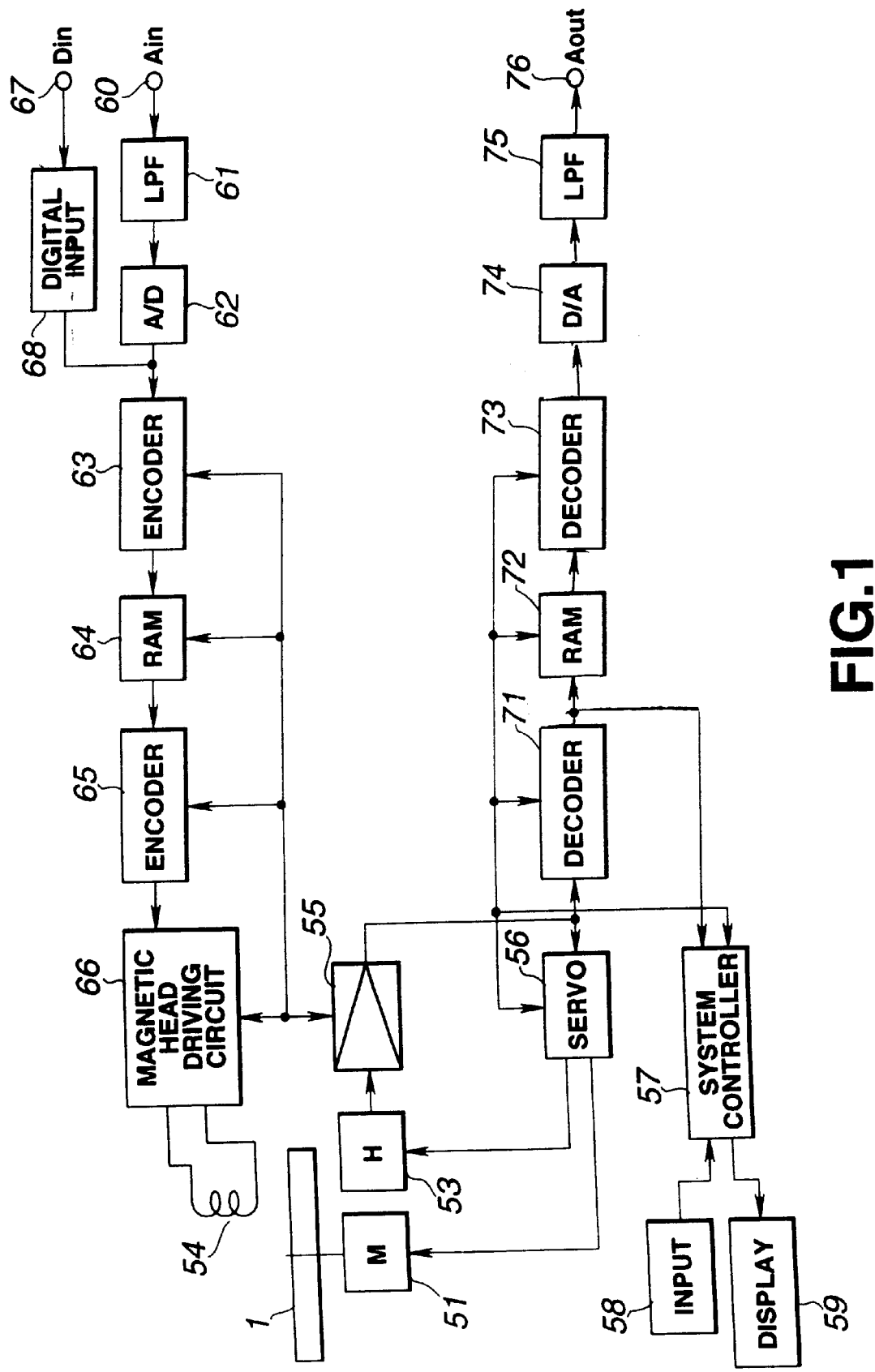
FIG. 1 is a block circuit diagram showing an illustrative arrangement of a conventional recording/reproducing device for compressed data.

Referring to the drawings, preferred embodiments of the present invention will be explained in detail.

The present invention provides an information encoding method for encoding the information, an associated information decoding apparatus and an information recording medium designed to cope with the first encoding method, referred to herein as the A-codec or the old standard and with the second encoding method, referred to herein as the B-codec or the new standard. The new standard represents an expanded version of the old standard.

Figure 4:
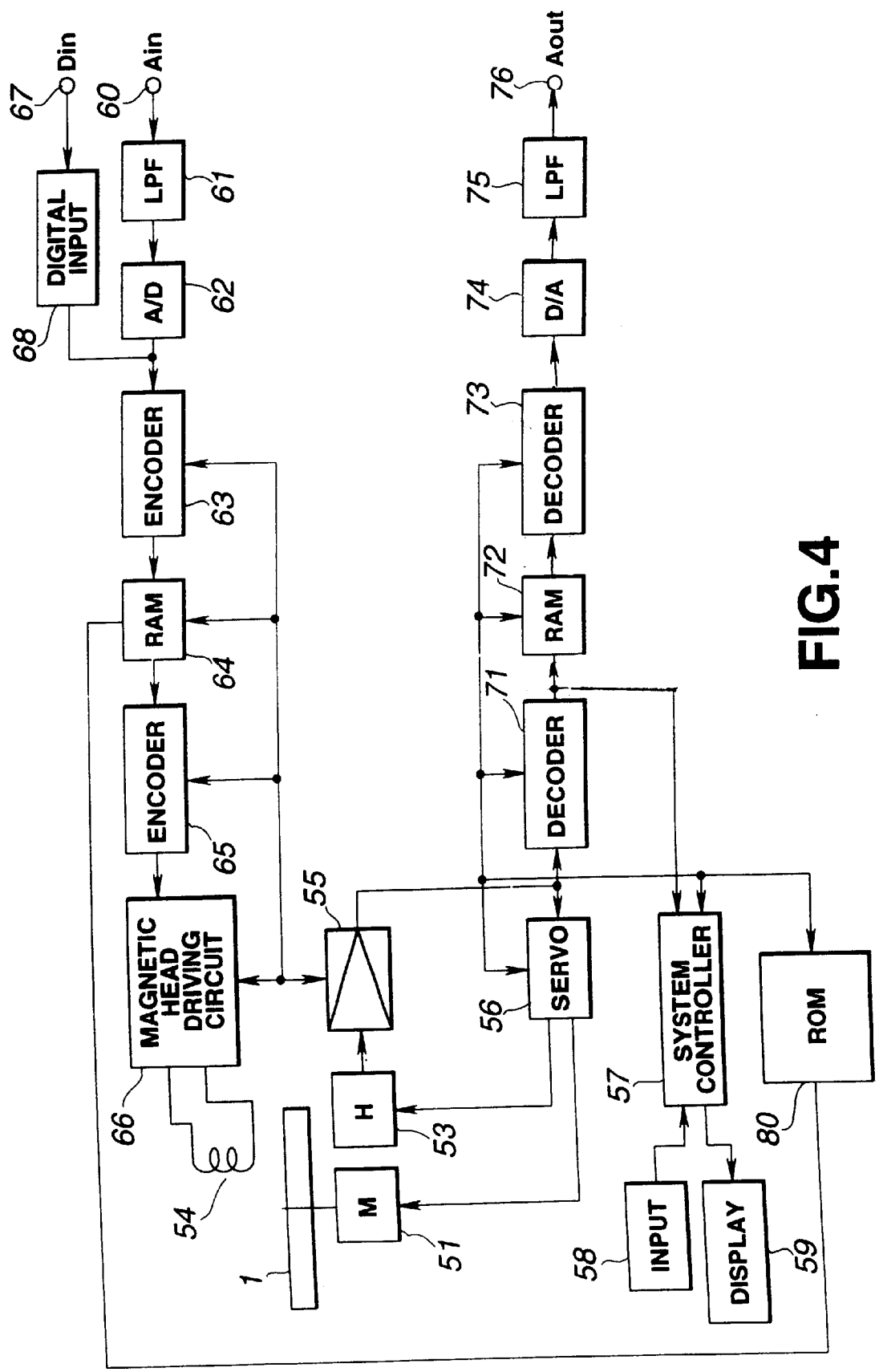
FIG. 4 is a block circuit diagram showing the structure of a recording/reproducing device according to first and second illustrative structures of the present invention.

The information encoding method according to the present invention is carried out by an information encoding and/or decoding device shown in FIG. 4, that is a compressed data recording/reproducing device, referred to herein simply as a recording/reproducing device.

First, the basic structure and operation of the recording/reproducing device shown in FIG. 1 is explained.

In the recording/reproducing device shown in FIG. 4, a magneto-optical disc 1 run in rotation by a spindle motor 51 is used as an information recording medium. For recording data on the magneto-optical disc 1, the magnetic field modulated in accordance with the recording data is impressed by a magnetic head 54, while the laser light is radiated by an optical disc 53, by way of magnetic field modulation recording for recording data along a recording track of the magneto-optical disc 1. During reproduction, the recording track of the magneto-optical disc 1 is traced by the optical head 53 and changes in the direction of polarization on reflection of the laser light by the magneto-optical disc 1 is detected for photomagnetic reproduction.

The optical head 53 is made up of optical components, such as a laser light source, for example, a laser diode, a collimator lens, an objective lens, a polarization beam splitter or a cylindrica lens, and a photodetector having light-receiving segments of a pre-set pattern. The optical head 53 is provided facing the magnetic head 54 with the magneto-optical disc 1 in-between. For recording data on the magneto-optical disc 1, the magnetic nead 54 is driven by a head driving circuit 66 of a recording system, as later explained, for applying a modulated magnetic field corresponding to the recording data, at the same time as the laser light is radiated on a target track of the magneto-optical disc 1, by way of performing thermo-magnetic recording in accordance with the magnetic field modulation system. In addition, the optical head 53 detects the reflected laser light from the target track for detecting focusing error signals and tracking error signals by the astigmatic method and by the push-pull method, respectively. For reproducing data from the magneto-optical disc 1, the optical head 53 detects the focusing error signals and tracking error signals while also detecting difference in the angle of polarization (Kerr rotation) of the reflected light from the target track of the laser light for generating the playback signals.

An output of the optical head 53 is sent to an RF circuit 55, which then extracts the focusing error signals and tracking error signals from the output of the optical head 53 to send the extracted signals to a servo control circuit 56 while converting the playback signals into bi-level signals and routing the bi-level signals to a decoder 71 of a reproducing system as later explained.

The servo control circuit 56 is made up of, for example, a focusing servo circuit, a tracking servo circuit, a spindle motor servo control circuit and a thread servo control circuit.

The focusing servo circuit focusing-controls the optical system of the optical head 53 so that the focusing error signal will be zero. The tracking servo circuit tracking-controls the optical system of the optical head 53 so that the tracking error signal will be zero. The spindle motor servo control circuit controls the spindle motor 51 for rotationally driving the magneto-optical disc 1 to rotate at a pre-set rotational velocity, such as constant linear velocity. The thread servo control circuit moves the optical head 53 and the magnetic head 54 to a target track position of the magneto-optical disc 1 designated by a system controller 57. The servo control circuit 56, performing these various control operations, sends to the system controller 57 the information specifying the operating states of various components controlled by the servo control circuit 56.

To the system controller 57 are connected a key input unit 58 and a display 59. The system controller 57 controls the recording system and the reproducing system by the operating input information by the key input unit 58. The system controller 57 also controls the recording position or the reproducing position on the recording track traced by the optical head 53 and the magnetic head 54 based on the sector-based address information read out from the recording track of the magneto-optical disc 1, such as the header time or the abb-code Q-data. The system controller 57 also causes the reproducing time to be displayed on the display 59 based on the data compression rate by the recording/reproducing device and the reproducing position information on the recording track.

For this reproducing time display, the sector-based address information reproduced from the recording track of the magneto-optical disc 1 by, for example, the header time or the sub-code Q data (absolute time information), is multiplied by the reciprocal of the data compression rate, such as 4 in case of 1/4 compression, to find the actual time information, which is displayed on the display 59. During recording, if the absolute time information is recorded (pre-formatted) on the recording track of, for example, a magneto-optical disc, this pre-formatted absolute time information may be read and multiplied by a reciprocal of the data compression rate for displaying the current position in terms of the actual recording time.

In the recording system of the recording/reproducing device, an analog audio input signal Ain from an input terminal 60 is fed via a low-pass filter 61 to an analog/digital (A/D) converter 62 which then quantizes the analog audio input signal Ain. On the other hand, a digital audio input signal Din from an input terminal 67 is supplied via a digital input interfacing circuit 68 to an ATC encoder 63. The ATC encoder 63 performs bit compression (data compression) associated with a pre-set data compression rate on digital audio PCM data of a pre-set transfer rate corresponding to the input signal Ain quantized by the A/D converter 62. The compressed data outputted by the ATC encoder 63 (ATC data) is routed to a memory (RAM) 64. If the data compression rate is 1/8, the data transfer rate in this area is reduced to one-eighth of the data transfer rate of the standard format (CD-DA format) of 75 sectors/second, or to 9.375 sectors/second.

The memory 64 has its data writing and data readout controlled by the system controller 57, and is used for temporarily storing the ATC data supplied from the ATC encoder 63 for recording on the disc when the necessity arises. That is, for the data compression rate of, for example, 1/8, the compressed audio data supplied from the ATC encoder 63 has its data transfer rate reduced to one-eighth of the data transfer rate of the standard CD-DA format of 75 sectors/second, or to 9.375 sectors/second. It is this compressed data that is continuously recorded on the memory 64. It is sufficient to record one of eight sectors, as explained previously. However, since the recording of every eight sector is virtually impossible, sector-continuous recording is performed, as will be explained subsequently.

This recording is done in a burst fashion, that is intermittently, at a data transfer rate equal to that of the standard CD-DA format or 75 sectors/second, with a 'cluster' as a recording unit with the interposition of a non-recoding period. The cluster is comprised of a pre-set plural number of sectors, such as 32, and several sectors each ahead and at back of the cluster. That is, in the memory 64, the ATC audio data, with the data compression rate of 1/8, continuously written at a low transfer rate of 9.375 (=75/8) sectors/second conforming to the above bit compression rate, is read out in a burst fashion as the recording data at the above-mentioned transfer rate of 75 sectors/second. The overall data transfer rate of the read-out and recorded data, inclusive of the non-recording period, is the above-mentioned low rate of 9.375 sectors/second. However, the instantaneous data transfer rate within the burst-like recording time is the above-mentioned instantaneous rate of 75 sectors/second. Therefore, if the rotational velocity of the disc is the same as the velocity of the standard CD-DA format (constant linear velocity), the recording performed is of the same recording density and the same storage pattern as those of the CD-DA format.

The ATC audio data read out in a burst fashion from the memory 64 at the transfer rate (instantaneous transfer rate) of 75 sectors/second, that is recording data, is sent to an encoder 65. In the data string supplied from the memory 64 to the encoder 65, the unit of continuous recording by one recording is the 'cluster' made up of a plurality of, for example, 32, sectors, and several cluster-connecting sectors arrayed before and after the 'cluster'. This cluster connecting sector is set so as to be longer than the interleaving length in the encoder 65 so that interleaving cannot affect data of other clusters.

The encoder 65 performs error correction processing, that is parity appendage, interleaving or EFM encoding, on the recording data supplied thereto in a burst fashion as described above. It is this recording data, thus processed by the encoder 65, that is routed to a magnetic head driving circuit 66. The magnetic head 54 is connected to this magnetic head driving circuit 66 which drives the magnetic head 54 for applying the modulated magnetic field corresponding to the recording data to the magneto-optical disc 1.

The system controller 57, controlling the memory 64 as described above, also controls the recording position so that the recording data read out in the burst fashion from the memory 64 will be continuously recorded on the recording track of the magneto-optical disc 1. The recording position is controlled by managing the recording position of the recording data read out in the burst fashion from the memory 64 by the system controller 57 for supplying a control signal designating the recording position on the recording track of the magneto-optical disc 1 to the servo control circuit 56.

The reproducing system is designed for reproducing recording data continuously recorded on the recording track of the magneto-optical disc 1 by the above recording system, and includes a decoder 71 fed from the RF circuit 55 with a bi-level version of the playback output obtained on tracing the recording track of the magneto-optical disc 1 by the laser light by the optical head 53. This reproducing system can read out information signals from not only the magneto-optical disc 1 but also from a read-only optical disc such as a Compact Disc (trade mark).

The decoder 71 is a counterpart device of the encoder 65 of the above-described recording system. Specifically, the decoder processes the bi-level playback output from the RF circuit 55 such as with the above-mentioned decoding for error correction of EFM decoding, and reproduces the ATC audio data having the data compression rate of 1/8 at a transfer rate of 75 sectors/second which is faster than the regular transfer rate. The playback data, obtained by the decoder 71, is routed to a memory (RAM) 72.

The memory 72 has data writing and data readout controlled by the controller 57, such that the playback data supplied from the decoder 71 at the transfer rate of 75 sectors/second is written therein in a burst fashion at the same transfer rate of 75 sectors/second. The playback data, written in the memory 75 at the transfer rate of 75 sectors/second, is continuously read out from the memory 72 at a transfer rate of 9.375 sectors/second corresponding to the data compression rate of 1/8.

The system controller 57 performs memory control of writing the playback data in a burst fashion in the memory 72 at the transfer rate of 75 sectors/second and continuously reading out the playback data written in a burst fashion in the memory 72 by this memory control from the recording track of the magneto-optical disc 1. In addition to performing the above-mentioned memory control for the memory 72, the system controller 57 performs playback position control of continuously reproducing the playback data written in a burst fashion in the memory 72 by this memory control from the recording track of the magneto-optical disc 1. The playback position is controlled by the system controller 57 managing the playback position for the playback data read out in a burst fashion from the magneto-optical disc 1 for supplying a control signal designating the playback position on the recording track of the magneto-optical disc 1 or the optical disc to the servo control circuit 56.

The ATC audio data, obtained as playback data continuously read out at the transfer rate of 9.375 sectors/second, are routed to an ATC decoder 73. The ATC decoder 73 can cope with both the A-coded and the B-codec. This ATC decoder 73 is a counterpart of the ATC encoder 63 of the recording system and reproduces the 16-bit digital audio data by 8-fold data expansion (bit expansion) of the ATC data. The digital audio data from the ATC decoder 73 is routed to a digital/analog (D/A) converter 74.

The D/A converter 74 converts digital audio data supplied from the ATC decoder 73 into analog signals for forming analog audio output signals Aout. The analog audio output signals Aout, thus obtained from the D/A converter 74, are outputted via low-pass filter 75 at an output terminal 76.

Figure 5:
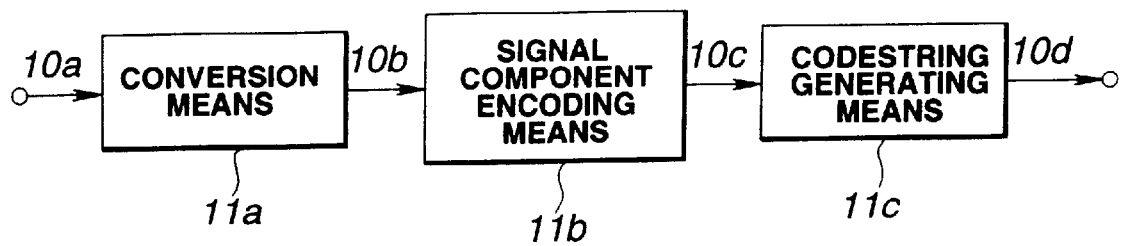
FIG. 5 is a block circuit diagram showing the structure of encoding means of the recording/reproducing device according to the present invention.

The configuration for the above-mentioned high-efficiency compression encoding applied to the recording/reproducing device of FIG. 4 is explained in detail. Specifically, the configuration for the -high-efficiency compression encoding applied to the recording/reproducing device of FIG. 4 corresponds to the encoder 63. In this encoder 63, the input digital signals, such as audio PCM signals, are encoded by high-efficiency encoding techniques, such as sub-band coding (SBC), adaptive transform coding (ATC) and adaptive bit allocation. The techniques for high-efficiency compression encoding will be explained by referring to FIG. 5ff.

The information encoding device executing the information encoding method for encoding the acoustic waveform signals according to the present invention (encoder 63 of FIG. 4) transforms an input signal waveform 10a by transform means 11a into signal frequency components 10b, encodes the signal frequency components 10b by signal component encoding means 11b and subsequently generates a codestring 10d from the encoded signals 10c generated by the signal component encoding means 11b in codestring generating means 11c.

The transform means 11a splits the input signal 20a by a band-splitting filter 12a into two bands to produce two band signals 20b, 20c which are transformed by forward orthogonal transform means 12b, 12c employing MDCT into spectral signal components 20d, 20e. The input signals 20a correspond to the signal waveform 10a of FIG. 5, while the input signals 20d, 20e correspond to the signal frequency components 10b of FIG. 5. In the transform means 11a having the configuration shown in FIG. 6, the bandwidths of the two band signals 20b, 20c are one-half the bandwidth of the input signal 20a, so that the input signal 20a has been thinned out by one-half. Of course, the transform means 11a may be configured differently from the above configuration. For example, the transform means 12a may be designed to transform the input signal directly into spectral signals by MDCT or to transform the input signal by DFT or DCT instead of by MDCT. The input signal may also be split into band components by a band-splitting filter. However, in the information recording method of the present invention, the above-described methods for transforming the input signal by the orthogonal transform are most convenient since a large number of frequency components can be obtained with a smaller processing volume.

Figure 7:
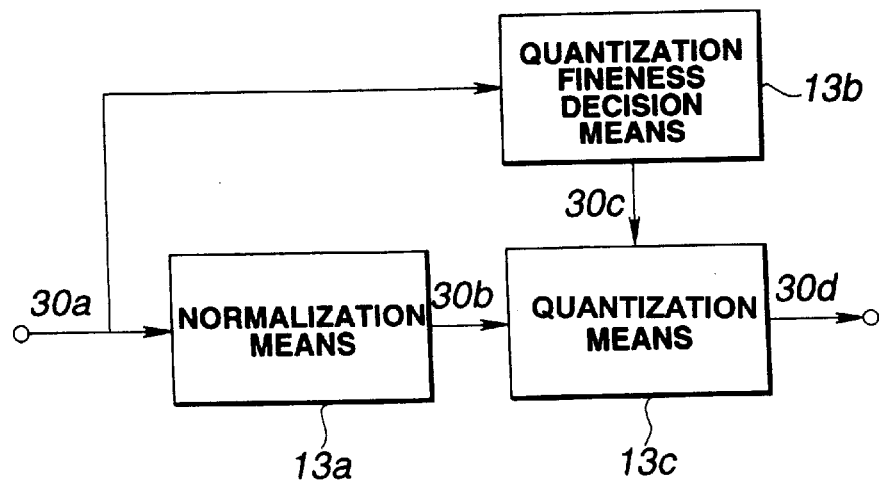
FIG. 7 is a block circuit diagram showing the structure of signal component encoding means of the encoding means.

The signal component encoding means 11b normalizes the signal components 30a from one pre-set band to another by normalization means 13a, as shown in FIG. 7. In addition, the signal component encoding means 11b calculates the quantization fineness information 30c from the signal components 30a by quantization fineness means 13b. Then, based on the quantization fineness information 30c, the quantization means 13c quantizes the normalized signal 30b from the normalization means 13a. The signal components 30a correspond to the signal frequency component 10b of FIG. 5, while an output signal 30d of the quantization means 13c corresponds to the encoded signal 10c of FIG. 5. The normalization coefficient information used for normalization and the quantization fineness information, in addition to the quantized signal components, are contained in the output signal 30d.

Figure 8:
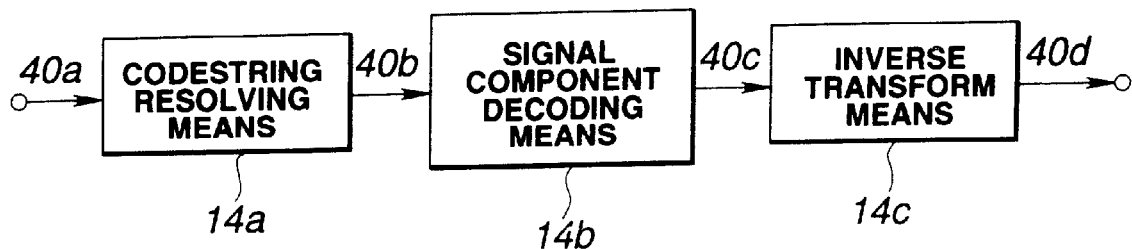
FIG. 8 is a block circuit diagram showing the structure of decoding means of the recording/reproducing device according to the present invention.

The information decoding device for regenerating audio signals from a codestring generated by the above-described information encoding device, a decoder 73 in the embodiment of FIG. 4, extracts codes 40b of respective signal components from a codestring 40a by codestring resolving means 14a, as shown in FIG. 8. From these codes 40b, the information decoding device restores the signal components 40c by the signal component decoding means 14b and regenerates acoustic waveform signals from the restored signal components 40c by inverse transform means 14c.

Figure 6:
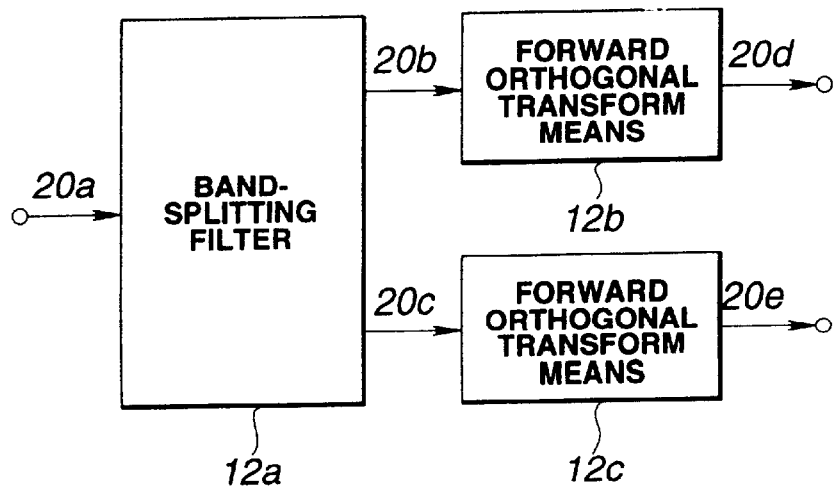
FIG. 6 is a block circuit diagram showing the structure of transform means of the encoding means.
Figure 9:
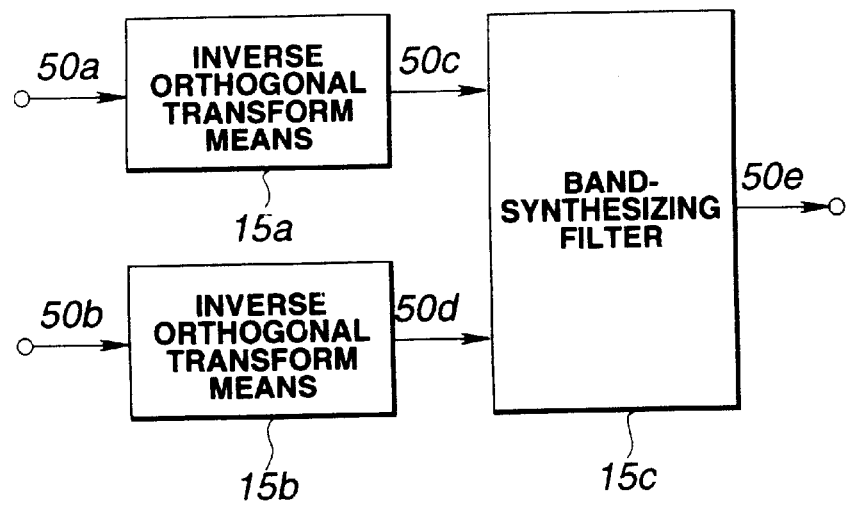
FIG. 9 is a block circuit diagram showing the structure of inverse transform means of the encoding means.

The inverse transform means 14c of the information decoding device is configured as shown in FIG. 9 and is a counterpart of the transform means shown in FIG. 6. In the inverse transform means 14c, shown in FIG. 9, the inverse transform means 15a, 15b apply inverse orthogonal transform on input signals 50a, 50b to restore respective band signals which are then synthesized by the band synthesizing filter 15c. The input signals 50a, 50b correspond to the signal 40c the respective signal components of which have been restored by the signal component restoration means 14b. An output signal 50e of the band synthesis filter 15c corresponds to the acoustic waveform signal 40d shown in FIG. 5.

Figure 10:
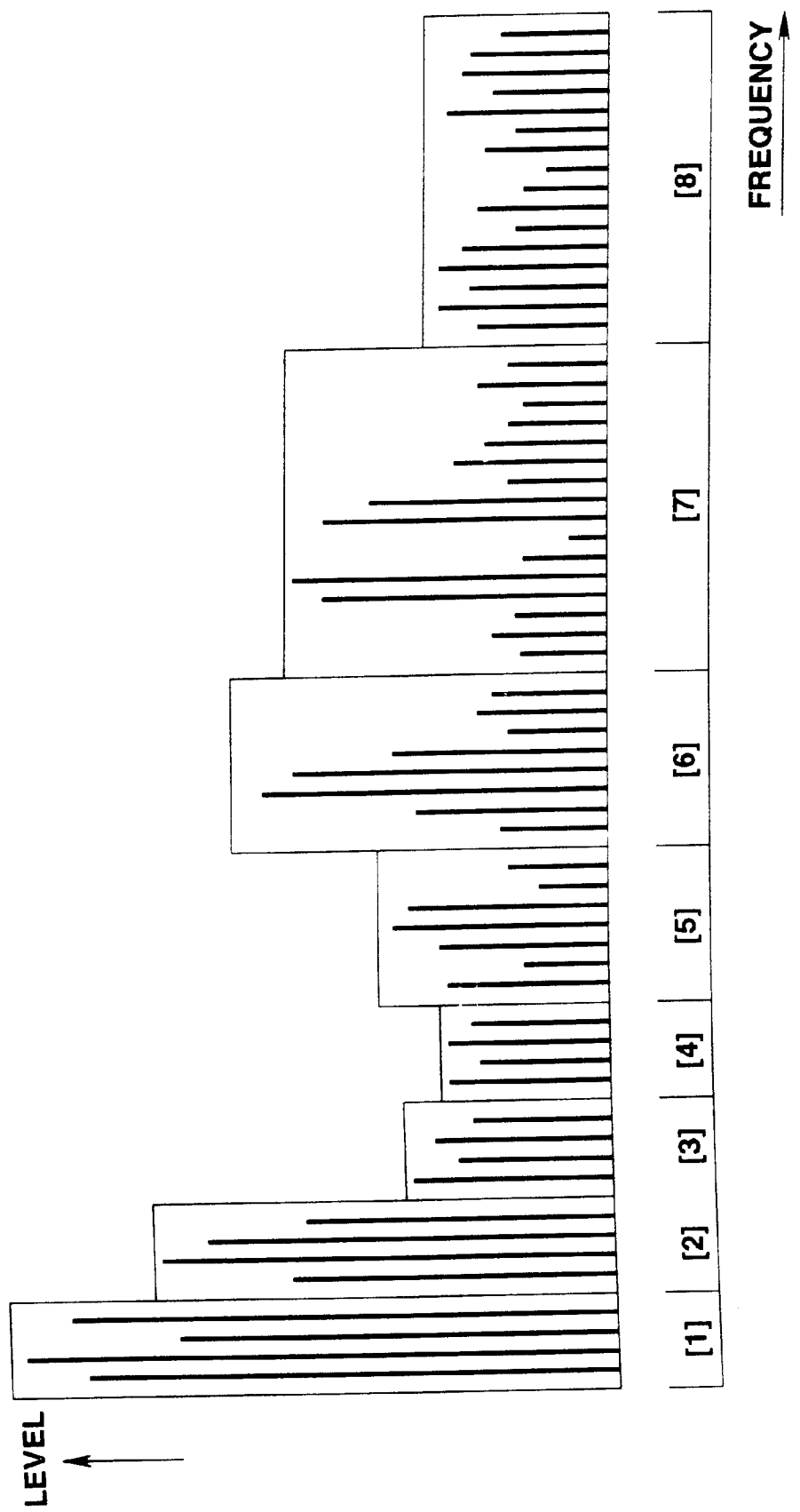
FIG. 10 illustrates the encoding means according to the present invention.

FIG. 10 shows spectral signal obtained by the transform means of the above-described information encoding means shown in FIG. 6. The spectral components shown in FIG. 10 correspond to the absolute values of spectral components by MDCT having the level converted in dB. That is, in the present information encoding device, the input signals are converted into 64 spectral signals from one pre-set time block to another. These 64 spectral signals are grouped into eight bands from [1] to [8], referred to herein as encoding units, and normalized and quantized from one encoding unit to another. If the quantization fineness is changed from one encoding unit to another depending on encoding the manner of distribution of the frequency components, perceptually efficient encoding with minimum sound quality deterioration may be achieved.

The encoding efficiency may be improved further over the above-described methods. For example, the encoding efficiency may be raised by employing the variable length encoding technique in which shorter and longer code lengths are accorded to the codes with higher frequency of occurrence and to those with lower frequency of occurrence, respectively. Also, if the pre-set time block for encoding the input signal, that is the transform block length for orthogonal transform, is selected to be longer, the volume of the subsidiary information, such as the quantization fineness information or the normalization coefficient information, can be reduced per block. In addition, since the frequency resolution is raised simultaneously, the frequency fineness on the frequency axis can be controlled more finely for raising the encoding efficiency.

Meanwhile, a recording/reproducing device embodying the present invention, shown in FIG. 4, has a read-only memory (ROM) 80, in addition to the above configuration. In the ROM 80 is stored the message signal encode by the A-codec.

The message signals read out from the ROM 80 under control by the system controller 57 is written from time to time via RAM 64 on the magneto-optical disc 1. For example, the message signal reads: 'For reproducing the signals of this disc, please use a reproducing machine adapted for coping with the B-codec' or 'two music numbers that cannot be reproduced except by a reproducing device adapted to cope with the B-codec are contained in the present disc'. These messages can be generated by synthesis of short speech elements, namely 'this', 're', 'pro', 'du', 'cing' and so forth, under control by the system controller 57. By so doing, a wide variety of messages can be generated and recorded using a ROM of a small capacity.

Figure 11:
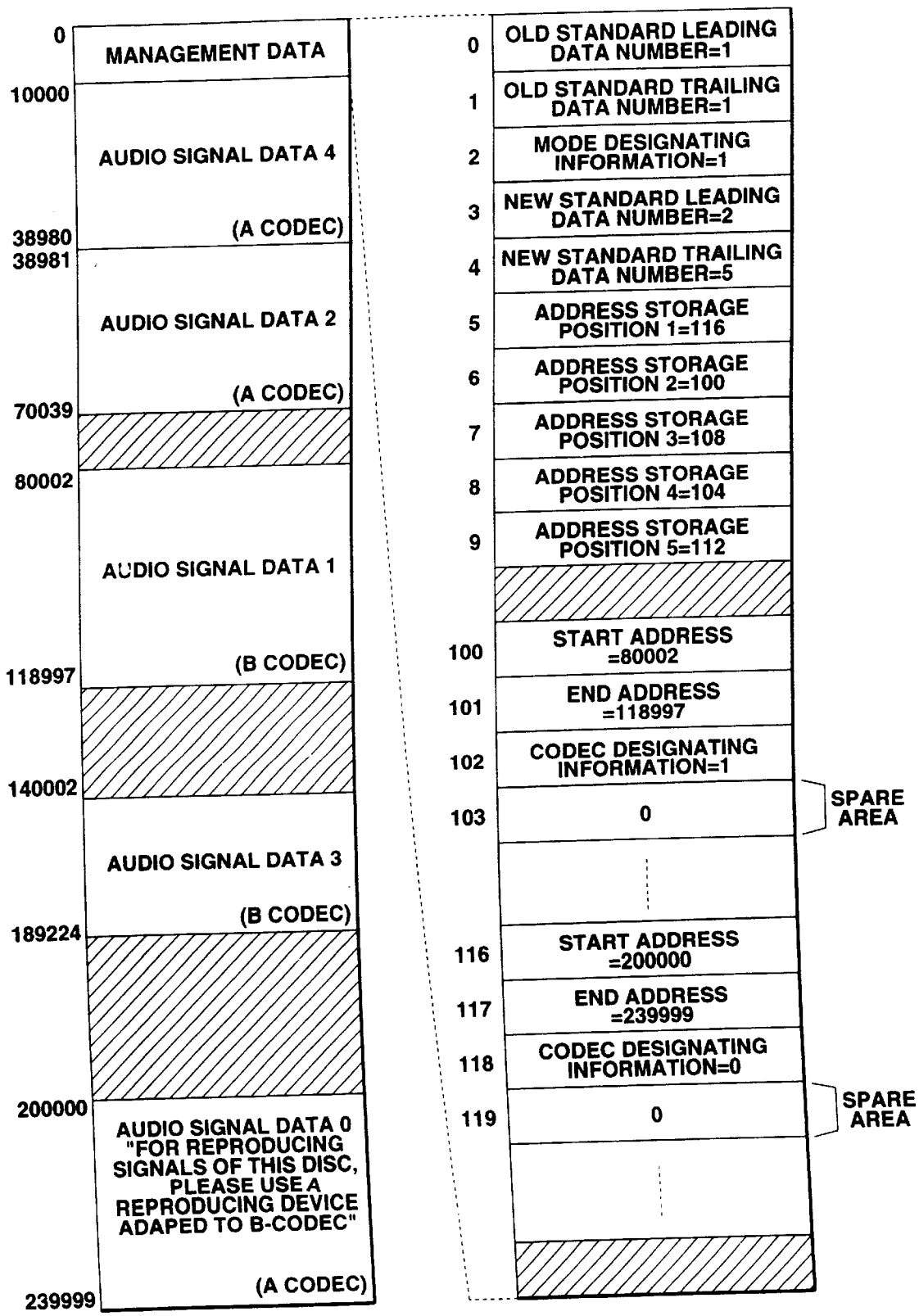
FIG. 11 illustrates the format according to a first illustrative structure of the present invention.

In an embodiment of the present invention, the format in which the above-described message signals are recorded along with the encoded signals on the magneto-optical disc is as shown in the first embodiment shown in FIG. 11. Meanwhile, FIG. 11 shows an example in which audio signal data encoded by the A-codec (old standard) and audio signal data encoded by the B-codec (new standard) are recorded on the same disc.

That is, in the example of FIG. 11, the fourth audio signal data (fourth music number) indicated as audio signal data 4, and the second audio signal data (second music number) indicated as audio signal data 2, are encoded by the A-codec, while the first audio signal data (first music number) indicated as audio signal data 1, and the third audio signal data (third music number) indicated as audio signal data 3, are encoded by the B-codec. In the example of FIG. 11, the above-mentioned message signal, encoded by the A-codec, is recorded as audio signal specified as audio signal data 0.

The numerical figures affixed to these audio signal data are not indicative of the playback sequence. The playback sequence is determined by the address storage positions as later explained. In the example of FIG. 11, the audio signal data 4 is recorded in the addresses 10000 to 38980, the audio signal data 2 is recorded in the addresses 38981 to 70039, the audio signal data 1 is recorded in the addresses 80002 to 118997 the audio signal data 3 is recorded in the addresses 140002 to 169224. Of course, FIG. 11 gives only an example such that a larger amount of the audio signal data can be recorded, while the addresses of recording the audio signal data are not limited to the example of FIG. 11.

In a disc having these audio signal data recorded thereon, the format of the first illustrative example is formulated so that, of the management data in use for recording and/or reproducing these audio signal data, the management data pertinent to message signals are recorded in isolation from management data pertinent to other signals.

Specifically, in FIG. 11, the leading data number specifying the leading data number of the message signal data recorded as the old standard is recorded in the address 0 of the management data area, while the last data number specifying the last data number of the message signal data recorded as the old standard is recorded in the address 1 of the management data area. In the example of FIG. 11, the value of the leading data number of the old standard is '1', while the value of the trailing data number of the old standard is also '1', signifying that only one data is permitted to be taken out from the disc by the reproducing means adapted for coping with the old standard.

The mode designation information is also recorded as the reproduction designating information in the address 2 of the management data area. The mode designating information having the value of 0 and 1 specifies that recording based only on the old standard (A-codec) and recording inclusive of the new standard (B-codec) have been done, respectively. In the example of FIG. 11, the value of the mode designating information is 1, from which it can be recognized that the recording inclusive of the new standard (B-codec) has been done on the disc.

In the addresses 3 and 4 of the management data area are recorded the leading data number specifying the leading data number of the audio signal data recorded inclusive of the new standard and the data number specifying the trailing data number of the audio signal data recorded inclusive of the new standard. In the example of FIG. 11, the value of the leading data number inclusive of the new standard is 2, while the value of the trailing data number inclusive of the new standard is 5, signifying that the audio signals that can be taken out from the disc by the reproducing device adapted for coping with the new standard are four musical numbers of from the second to fifth musical numbers.

Figure 2:
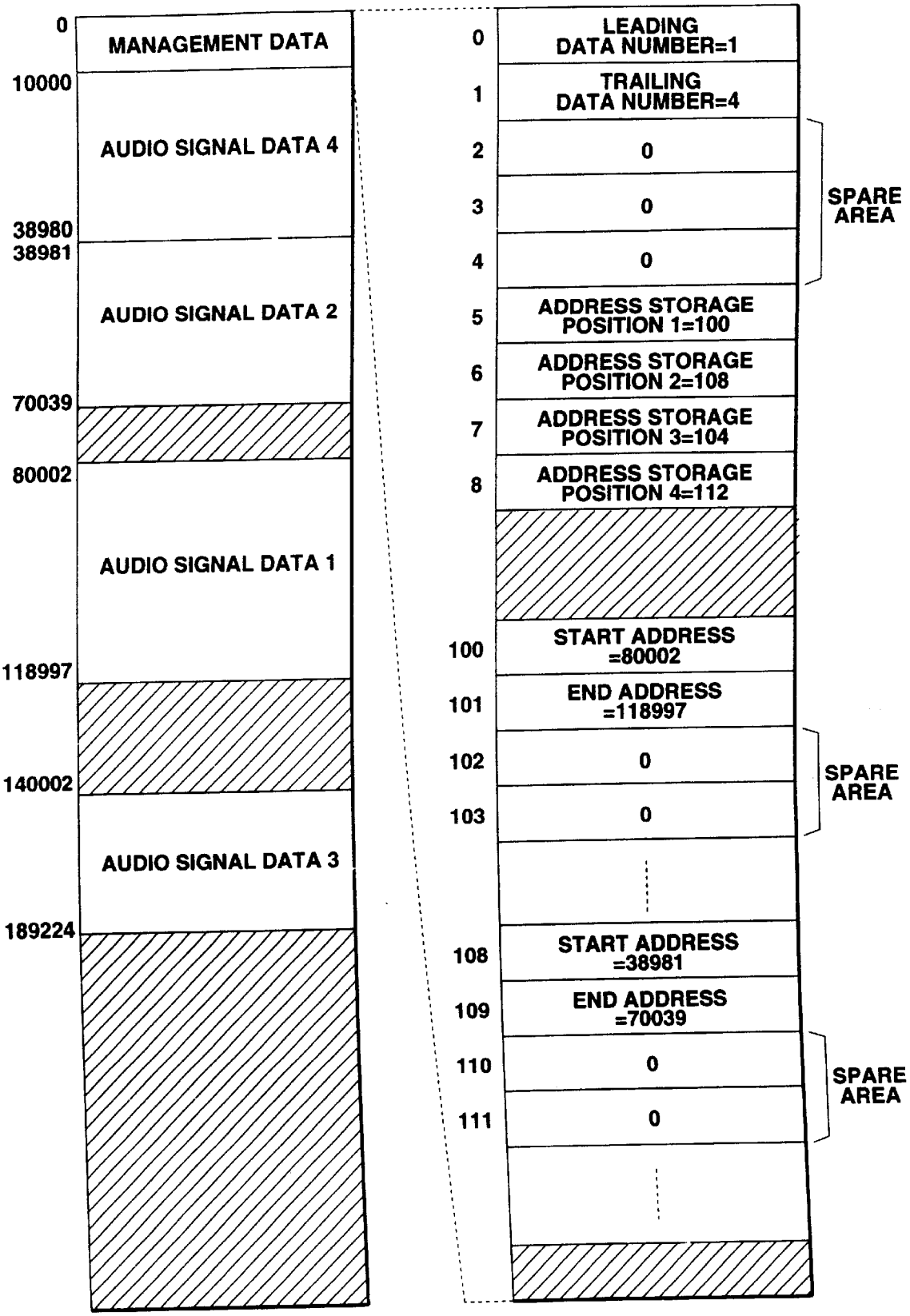
FIG. 2 illustrates an encoding method by a conventional technique.
Figure 3:
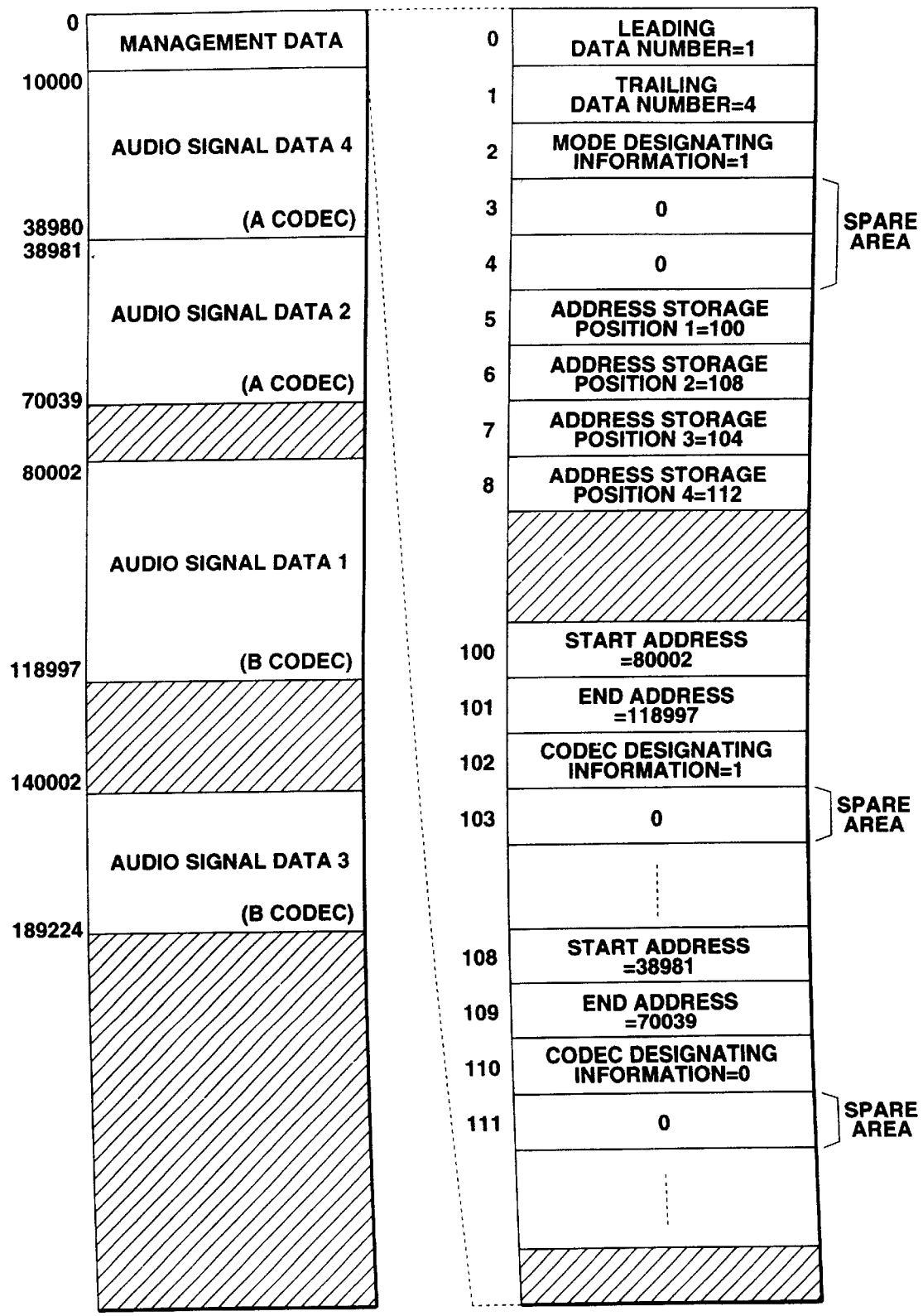
FIG. 3 illustrates another encoding method by a conventional technique.

In addition, in the addresses 5 to 9 of the management data area, there is recorded, as in FIG. 2, the information on the address storage position specifying where the address information, that is 'data indicating where each audio signal data has been recorded on the disc', is recorded in the management data area. The information on the address storage position for the audio signal data reproduced first (audio signal data reproduced first) is stored in the address 5, while the information on the address storage position for the audio signal data reproduced second (audio signal data reproduced second) is stored in the address 6, and so forth. By using the above management data, the reproducing sequence for the first and second data, that is the reproducing sequence of the first and second musical numbers, can be easily exchanged by exchanging the contents of the addresses 5 and 6 (the information on the addresses 5 and 6) in place of exchanging the actual recording positions of the audio signal data. In the example of FIG. 11, the address storage position 1 of the address 5 specifies that the address information for audio signal data reproduced first is stored in the address 116, while the address storage position 2 of the address 6 specifies that the address information for audio signal data reproduced second is stored in the address 100. Similarly, the address storage position 3 of the address 7 specifies that the address information for audio signal data reproduced third is stored in the address 108, and the address storage position 4 of the address 8 specifies that the address information for audio signal data reproduced fourth is stored in the address 104, while the address storage position 5 of the address 9 specifies that the address information for audio signal data reproduced fifth is stored in the address 112.

In the above address information, the address information stored in the address 116 specified by the address storage position 1 of the address 5 specifies that the start address and the end address are 200000 and 239999, respectively. Thus, the above-mentioned signal reproduced first is the audio signal 0 recorded in the addresses of from 200000 and 239999. For example, the address information stored in the address 100 specified by the address storage position 2 of the address 6 specifies that the start address is 80002 and the end address is 118997. Thus the signal reproduced second is the above-mentioned audio signal data 1 recorded in the addresses 80002 to 118997.

The area of the management data area next following the are used for recording the start addresses and the end addresses (address information) for the respective audio signal data is used as the area for the codec designating information. The codec designating information of the value 0 indicates that the audio signal data specified by the address information (start addresses and the end addresses) has been encoded in accordance with the old standard, while the codec designating information of the value 1 indicates that the audio signal data specified by the address information (start addresses and the end addresses) has been encoded in accordance with the new standard, as explained previously. In the example of FIG. 2, since the codec designating information recorded in the address 102 next following the addresses 100 and 101 for the address information of the audio signal data reproduced second has a value of 1, the audio signal data 1 reproduced second has been encoded in accordance with the new standard, that is by the B-codec. On the other hand, since the codec designating information recorded in the address 118 next following the addresses 116 and 117 for the address information of the audio signal data reproduced first has a value of 0, the audio signal data 0 reproduced first has been encoded in accordance with the old standard, that is by the A-codec.

For reproducing the disc recorded as in the above-described first example by the reproducing device configured in accordance with only the old standard, the following procedure is used:

For reproducing the disc recorded as in the above-described first example by the reproducing device conforming to the old standard, the leading data number of the old standard and the last data number of the old standard of FIG. 1 are first read. By this, the reproducing device construes that the audio signal data reproducible from the disc is a sole musical number as from the first musical number, that is only one musical number.

The reproducing device, designed for coping with the old standard, checks the contents of the fifth address storage position associated with the first reproduction for confirming where the audio signal data reproduced first has been recorded on the disc. The reproducing device, designed for coping with the old standard, understands that '0' is recorded in each of the addresses 2 to 4 as explained with reference to FIG. 2, so that it does not read out the contents of the addresses 2 to 4 or, if it reads out the contents, overrides the read-out contents.

Thus, the reproducing device, designed for coping with the old standard, checks the contents of contents of the fifth address storage position, in accordance with the old standard, in order to learn the address of recording of the address information specified by the address storage position (the position of the management data area). The reproducing device, designed for coping with the old standard, then takes in the address information (start and end addresses) of the audio signal data to be reproduced. The start and end addresses, recorded as the address information in the address 116ff., denote the addresses 200000 to 239999, as described above. The above-mentioned audio signal data 0 is recorded in these addresses. The reproducing device, designed for coping with the old standard, understands that '0' is recorded in the address 118 as explained with reference to FIG. 2, so that it does not read out the contents of the address or, if it reads out the contents, it overrides the read-out contents.

Thus, the reproducing device, designed for coping with the old standard, reproduces only the contents of the audio signal data 0 from the disc. That is, the recording/reproducing device reproduces the message speech running: 'Please use a reproducing device conforming to the B-codec for reproducing the signals of this disc' recorded as the audio signal data 0.

By recording in accordance with the format of the first illustrative example shown in FIG. 11, it becomes possible to prevent the audio signals conforming to the new standard, that is the B-codec, from being erroneously reproduced by the reproducing device, designed for coping with the old standard, and hence to prevent troubles caused to the user of the reproducing device designed for coping with the old standard as a result of reproduction of the message signal.

The following is the processing flow when reproducing the disc recorded as in the above-described first illustrative example by the reproducing device designed for coping with the standard.

For reproducing the disc, recorded in the above-described first illustrative example, by the reproducing/reproducing device designed for coping with the new standard, the reproducing/reproducing device first checks the contents of the mode designating information recorded in the address 2. Since the value of the mode designating information of the address 2 is '1', the reproducing/reproducing device designed for coping with the new standard is advised that the disc has been recorded in accordance with the new standard.

Then, based on the prescriptions for the case of the value of the mode designation being 1, the reproducing/reproducing device designed for coping with the new standard overrides the leading data number and the trailing data number of the old standard recorded in the addresses 0 and 1, and reads out the leading data number and the trailing data number of the new standard recorded in the address 3 and 4, respectively. In the example of FIG. 11, the value of the leading data number recorded in the address 3 is 2, while that of the trailing data number recorded in the address 4 is 5. Thus the audio signal data according to the new standard reproducible from the disc is judged to be 4, as explained previously.

Then, for comprehending where the above second to fifth audio signal data have been recorded on the disc, the reproducing/reproducing device designed for coping with the new standard checks the contents of the address storage positions of the addresses 6 to 9 associated with the reproduction of the second to fifth information data.

In this manner, the reproducing/reproducing device designed for coping with the new standard checks the contents of the address storage positions of the addresses 6 to 9 in accordance with the new standard for learning the addresses (positions in the management data area) where the address information specified by the address storage positions have been recorded. The reproducing/reproducing device designed for coping with the new standard then takes in the address information (start and end addresses) of audio signal data to be sequentially reproduced from the addresses 100, 108, 104 and 112 specified by the address storage positions of from 6 to 9. For example, the address information recorded in the addresses 100ff specifies the start address 8000 and the end address 118997. In an area specified by these addresses is recorded the audio signal data 1. The reproducing/reproducing device designed for coping with the new standard reads out the value 1 of the codec designating information of the address 102 which is the address next following the address information. The reproducing/reproducing device designed for coping with the new standard thus recognizes that the audio signal data 1 has been encoded in accordance with the B-codec and reproduces the contents. Thus, the reproducing/reproducing device designed for coping with the new standard repeats the above processing for the address information of the addresses 108, 104 and 112 and audio signal data of the A-codec or the B-codec associated with the address information.

That is, by the recording performed in accordance with the format of the third illustrative example shown in FIG. 11, the audio signal data by the B-codec contained in the new standard can be reproduced by the reproducing/reproducing device designed for coping with the new standard.

Since the reproducing/reproducing device designed for coping with the new standard overrides the leading and trailing data numbers of the old standard, there is no risk of the above-mentioned message being reproduced. However, for provoking attention on the part of the user of the recording/reproducing device reproducing the disc, the above-mentioned message may also be reproduced in the recording/reproducing device designed for coping with the new standard. In such case, it suffices if the value of the leading data number of the new standard recorded in the address 3 is set to 1. That is, if the value of the leading data number of the new standard recorded in the address 3 is set to 1, the start and end addresses of the addresses 116ff. are read out to enable the audio signal data 0 as the message signal to be reproduced as described above.

According to the present invention, as described above, not only the desired audio signal data recorded on the disc can be reproduced in the recording/reproducing device adapted to cope with the new standard, but also only the above-mentioned message for provoking the attention of the user in connection with data reproduction is reproduced in the reproducing adapted to cope with the old standard, thus preventing the user from being distressed needlessly.

In the example of FIG. 11, it is the message provoking the attention on the part of the user in connection with data reproduction that can be reproduced by the reproducing adapted to cope with the old standard. However, all audio signal data by the A-codec recorded on the disc can be reproduced by the reproducing adapted to cope with the old standard. The format of a second specified example for implementing it is now explained with reference to FIG. 12.

Figure 12:
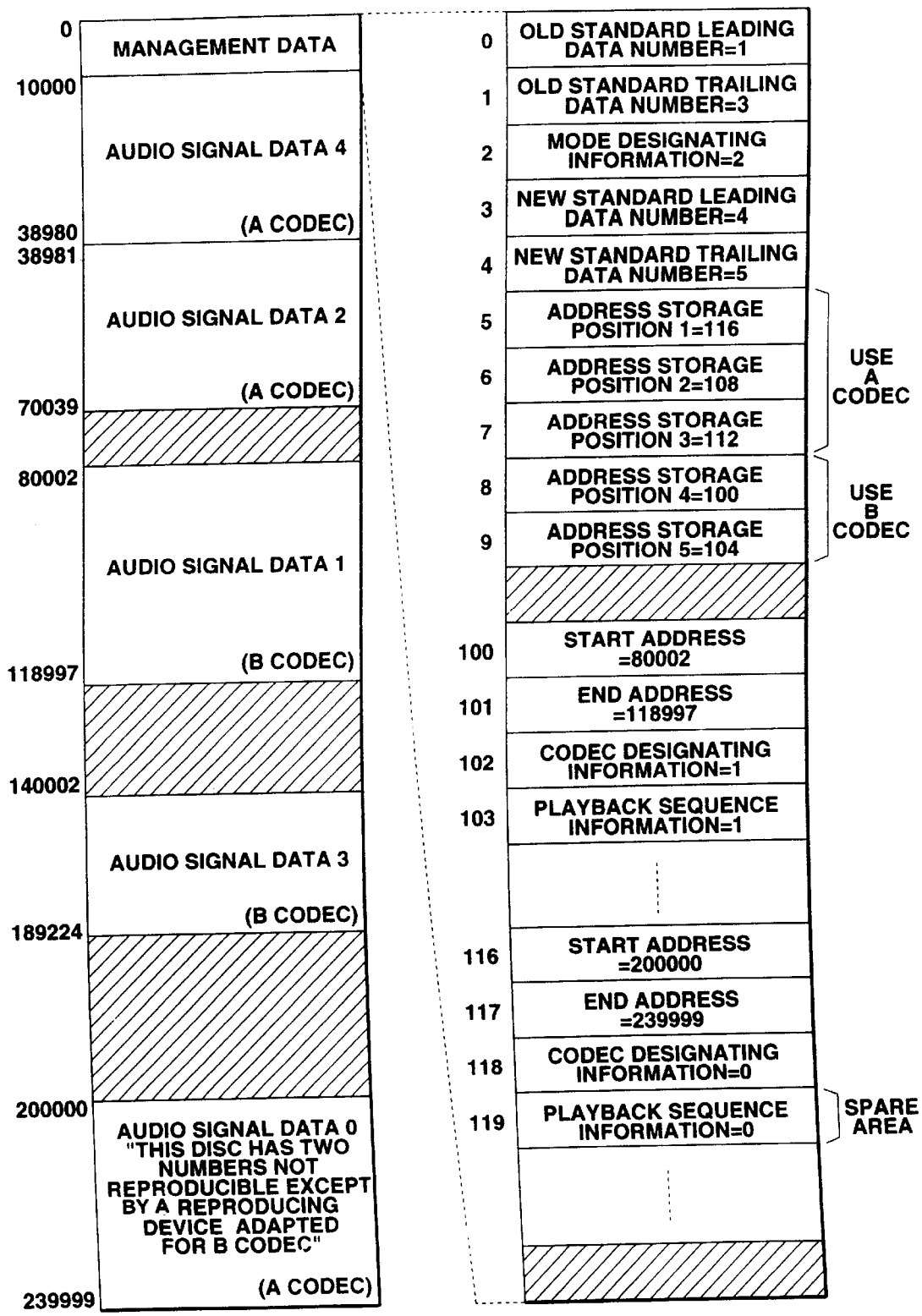
FIG. 12 illustrates the format according to a second illustrative structure of the present invention.

In the second illustrative example of FIG. 12, similarly to the example of FIG. 11, the audio signal data 4 and 2 are recorded in accordance with the A-codec, while the audio signal data 1 and 3 are recorded in accordance with the B-codec. In the example of FIG. 12, the contents reading: "There are two musical numbers in the disc that cannot be reproduced except by the reproducing device adapted for coping with the B-codec" are recorded, as the audio signal data 0, as a message signal by the A-codec. Meanwhile, the present message signal is prepared by the system controller 57 counting the number of data encoded in accordance with the B-codec prior to recording the data on the recording/ reproducing device adapted for coping with the new standard shown in FIG. 4, synthesizing the data based on the information and recording the synthesized data on the disc.

In the addresses 0 and 1 of the management data area are recorded the leading data number of the old standard and the trailing data number of the old standard, respectively. In the example of FIG. 12, the leading data number and the trailing data number of the old standard are 1 and 3, respectively. This indicates that it is the three data (musical numbers) of the first to third data that can be taken out as the old standard from the disc. The above value being 2 signifies that the address storage position of the audio signals by the A-codec and that of the audio signals by the B-codec are recorded separately.

In the addresses 3 and 4 of the management data area are recorded 4 and 5 as the value of the leading data number of the new standard and as the value of the trailing data number of the new standard, respectively. This indicates that the audio signal data that can be taken out from the disc as the new standard is two data, that is the above fourth and fifth data.

Moreover, there is also recorded the information on the address storage position in the addresses 5 to 9 of the management data area, as in FIG. 11. However, in the example of FIG. 12, the address 116 is recorded as the storage position for the address information for the audio signal data reproduced first, the address 108 is recorded as the storage position for the address information for the audio signal data reproduced second, the address 112 is recorded as the storage position for the address information for the audio signal data reproduced third, the address 100 is recorded as the storage position for the address information for the audio signal data reproduced fourth, and the address 104 is recorded as the storage position for the address information reproduced for the audio signal data reproduced fifth.

In the example of FIG. 12, the value of the leading data number of the old standard of the address 0 and that of the address 1 are 1 and 3, respectively, while the leading data number of the new standard of the address 3 and that of the address 4 are 3 and 5, respectively, so that, of the address storage positions 1 to 5 of the addresses 5 to 9, the address storage positions 1 to 3 of from the address 5 to the address 7 correspond to the A-codec, while the address storage positions 4 and 5 of the address 8 and 9 correspond to the B-codec.

In the above address information specified by the address storage positions, the areas next following the start address recording area and the end address recording area are used as areas for recording the codec designating information, while the areas next following the codec designating information are used as the areas for the playback sequence information. The playback sequence information is provided for reproducing the data by the A-codec and that by the B-codec in an optional sequence in the recording/reproducing device adapted for coping with the new standard. That is, in the example shown in FIG. 11, the reproducing sequence in the recording/reproducing device adapted for coping with the new standard is the same as the recording sequence for the data of the address storage positions. In the example shown in FIG. 12, the address storage position by audio signal data by the B-codec also needs to be recorded continuously, while the address storage position by audio signal data by the B-codec needs to be recorded continuously. Thus, for reproducing the audio signal data by the A-codec and that by the B-codec by the recording/reproducing device adapted for coping with the new standard in an optional sequence, it is necessary to provide distinct prescriptions. The above-mentioned reproducing sequence information is provided for prescribing the playback sequence in the recording/reproducing device adapted for coping with the new standard. More specifically, the reproducing sequence information becomes valid only when the value of the mode designation information is 2. The value of the reproducing sequence information is associated with the sequence of the address storage position. The reproducing processing flow by the reproducing sequence information will be explained in detail subsequently.

In the example of FIG. 12, the address information stored in the address 116 designated by the address storage position 1 of the address 5 has the start address of 2000000 and the end address of 239999, as in the example of FIG. 11. On the other hand, the address information stored in the address 100 delineated by the address storage position 4 of the address 8 indicates that the start address and the end address are 80002 and 118997, respectively.

The processing flow in reproducing a disc, recorded in a second illustrative example of FIG. 12, by a reproducing device adapted for coping with the old standard, is as follows:

In reproducing the disc, recorded as shown in FIG. 12 by the reproducing device adapted for coping with the old standard, the leading data number and the trailing data number of the old standard, recorded in the addresses 0 and 1 of FIG. 2, are read. The reproducing device adapted for coping with the old standard understands that the audio signal data that can be reproduced from the disc are three data of from data 1 to data 3.

The reproducing device, designed for coping with the old standard, checks the contents of the fifth to seventh address storage positions associated with the first to third reproduced audio data for confirming where the audio signal data reproduced as first to third data has been recorded on the disc. The reproducing device, designed for coping with the old standard, understands that '0' is recorded in each of the addresses 2 to 4 as explained with reference to FIG. 2, so that it does not read out the contents of the addresses 2 to 4 or, if it reads out the contents, it overrides the read-out contents.

Thus, the reproducing device, designed for coping with the old standard, checks the contents of the fifth to seventh address storage positions, in accordance with the old standard, in order to learn the address of recording of the address information specified by the address storage position (the position of the management data area). The reproducing device, designed for coping with the old standard, then takes in the start and end addresses of the audio signal data to be reproduced, from the addresses 116, 108 and 112 read out from the address storage positions of from the fifth address five to the seventh address. The start and end addresses, recorded as the address information in the address 116ff., denote the addresses 200000 to 239999, as described above. The above-mentioned audio signal data 0 is recorded in these addresses. The reproducing device, designed for coping with the old standard, understands that '0' is recorded in the addresses 118 and 119 as explained with reference to FIG. 2, so that it does not read out the contents of the address 118 and 119 or, if it reads out the contents, it overrides the read-out contents.

Thus the reproducing device, designed for coping with the old standard reproduces the contents of the audio signal data 0 depending on the address information associated with the address storage position of the address 5 from the disc. The reproducing device then reproduces audio signal data based on the address information associated with the address storage position of the address 6 and audio signal data based on the address information associated with the address storage position of the address 7, in this order. The reproducing device designed for coping with the old standard reproduces the message running: "there are two musical numbers in this disc that cannot be reproduced except by a reproducing device adapted for coping with the B-codec" and subsequently reproduces two audio signals by the A-codec.

With the second illustrative example shown in FIG. 12, in recording data by the recording/reproducing device adapted for coping with the new standard, as shown in FIG. 4, the system controller 57 counts the number of data encoded by the B-codec based on management data, and records a message signal by the B-codec running: "there are two musical numbers in this disc that cannot be reproduced except by a reproducing device adapted for coping with the A-codec" synthesized based on the counted data. Thus, when reproducing the disc recorded in accordance with the format of the second illustrative example shown in FIG. 12 by a reproducing device adapted for coping with the old standard, it becomes possible to prevent audio signals by the B-codec as the new standard from being erroneously reproduced, while it becomes possible to advise the user of the reproducing device adapted for coping with the old standard how much of the recorded data cannot be reproduced for thereby evading the dismay. Of course, the contents to be transmitted by the message is not limited to the number of musical numbers that cannot be reproduced, but may also be the amount of data that cannot be reproduced or the total time of the musical numbers that cannot be reproduced. As for the address storage positions, shown in FIG. 12, audio signal data encoded by the A-codec are recorded in the addresses 5 to 7, while data encoded by the B-codec are recorded in the addresses 8 and 9. The value of the leading data number of the old standard is set to 1, while that of the trailing data number of the old standard is set t 3. Thus the reproducing device adapted for coping with the old standard can reproduce all three audio signal data encoded by the A-codec.

The processing flow for reproducing the disc recorded as in the second illustrative example shown in FIG. 12 by the recording/reproducing device adapted for coping with the new standard is as follows:

The recording/reproducing device adapted for coping with the new standard first checks the contents of the mode designating information recorded in the address 2. Since the value of the mode designating information of the address 2 is 2 in the example of FIG. 12, the recording/reproducing device adapted for coping with the new standard is apprized of the fact that the disc has been recorded based on the new standard, and that the reproduction should be carried out based on the reproducing sequence information recorded on the disc.

The recording/reproducing device adapted for coping with the new standard reads out, based on the prescriptions for the value of the mode designation information equal to 2, the contents of the leading data number and the trailing data number of the old standard recorded in the addresses 0 and 1 and the leading data number and the trailing data number of the new standard recorded in the addresses 3 and 4. In the example of FIG. 12, the value of the leading data number of the old standard recorded in the address 0 is 1, that of the trailing data number of the old standard recorded in the address 1 is 3, that of the trailing data number of the new standard recorded in the address 3 is 4 and that of the trailing data number of the new standard recorded in the address 4 is 5. Thus the recording/reproducing device understands that three audio signal data by the old standard and two audio signal data by the new standard have been recorded on the disc.

The recording/reproducing device adapted for coping with the new standard then checks the contents of the address storage positions of the addresses 5 to 9 in order to learn the recording position of the audio signal data.

Thus the recording/reproducing device, adapted for coping with the new standard, checks the contents of the address storage positions of the addresses 5 to 9 in order to learn the addresses where the address information designated by the address storage positions has been recorded. The recording/reproducing device then takes in the address information of the respective addresses read out from the address storage positions of the addresses 5 to 9. Based on the reproducing sequence information provided in association with the respective address information data, the recording/reproducing device recognizes the reproducing sequence of the audio signal data to reproduce the audio signal data in the sequence corresponding to the reproducing sequence information. Of course, the above-mentioned message signals can be reproduced in the recording/reproducing device for the new standard associated with the example of FIG. 12. The contents to be transmitted by the message are not limited to the number of musical numbers that cannot be reproduced, but may also be the amount of data that cannot be reproduced or the total time of the musical numbers that cannot be reproduced.

Figure 13:
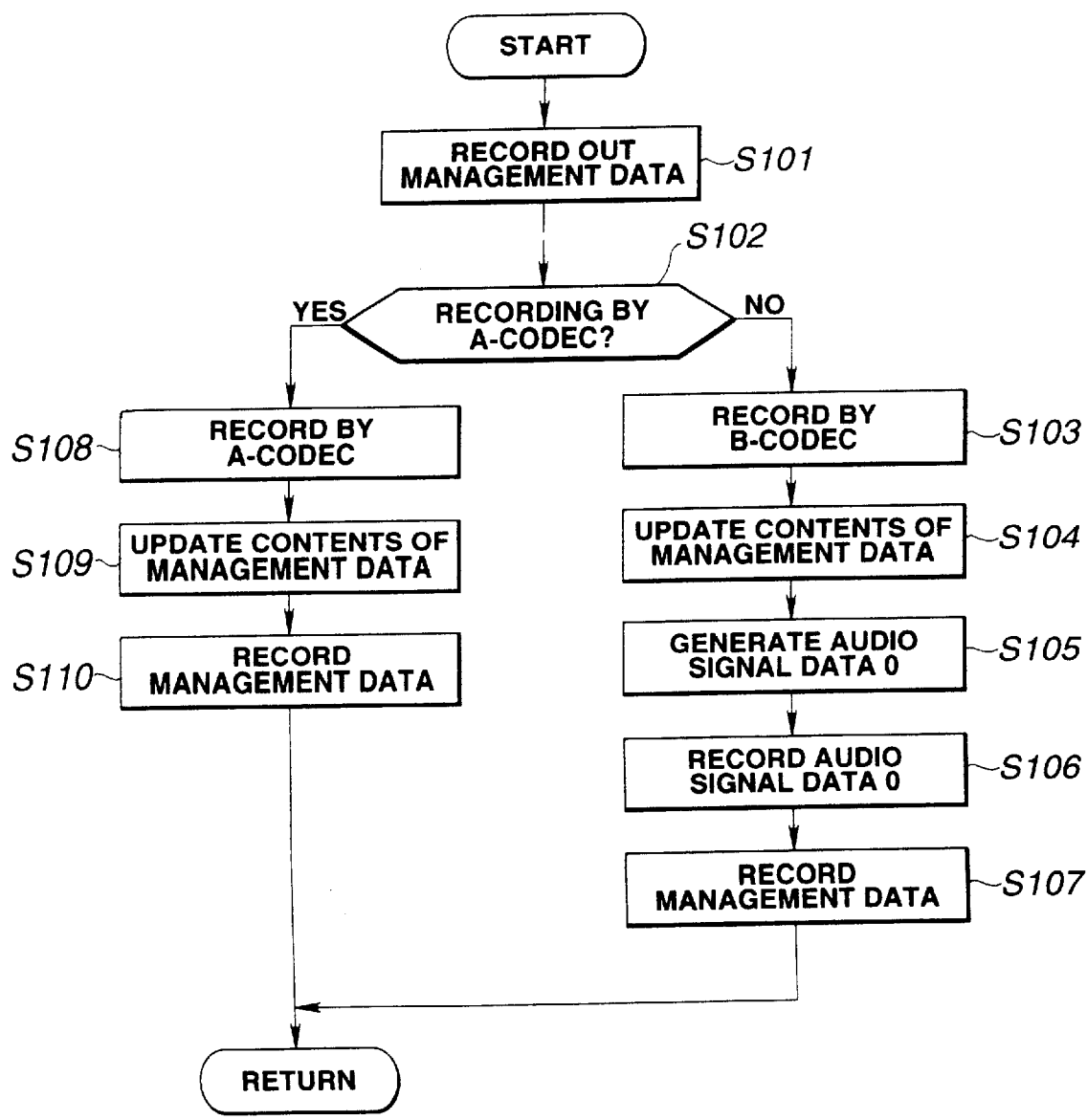
FIG. 13 is a flowchart showing the processing flow of data recording in a recording device designed to cope with the new standard for implementing the first and second illustrative structures of the present invention.

Referring to FIG. 13, the processing flow of the system controller 57 in case of recording data on the disc by the recording/reproducing device adapted for coping with the new standard is explained by referring to FIG. 13. The flowchart of FIG. 13 is adapted for coping with both the above-described first and second illustrative examples.

Referring to FIG. 13, the system controller 57 first reads out (takes in) the management data at step S101 and checks at step S102 whether the signal s recorded in accordance with the A-codec or in accordance with the B-codec.

If, in the judgment step of step S102, the signal is judged to be made in accordance with the B-codec, the system controller 57 proceeds to step S103 to transfer to the recording mode by the B-codec. That is, the system controller 57 updates the management data depending on how the actual recording has been made, as in FIGS. 11 and 12. At the next step S105, the system controller 57 generates the above-mentioned message signal running: "Please use the reproducing device adapted for coping with the B-codec for reproducing signals of this disc", if the mode designating information is set to 1 as shown in FIG. 12. On the other hand, if the value of the mode designating information is set to 2, as shown in FIG. 12, the system controller 57 generates the above-mentioned message signal running: "there are two music numbers in this disc that cannot be reproduced except by the reproducing device adapted for coping with the B-codec". The message signal has been encoded in accordance with the A-codec. The mode designating information during recording is entered by the user. At the next step S107, the updated management data is recorded on the disc.

If, at the step S102, it is determined to make signal recording by the A-codec, the system controller 57 proceeds to step S108 to transfer to the recording mode by the A-codec. At the next step S109, the system controller 57 updates the contents of the management data. At the next step S110, the management data is recorded on the disc.

Referring to FIG. 4, the processing flow of the system controller 57 in case of reproducing signals from the disc by the recording/reproducing device adapted for coping with the new standard shown in FIG. 4.

Figure 14:
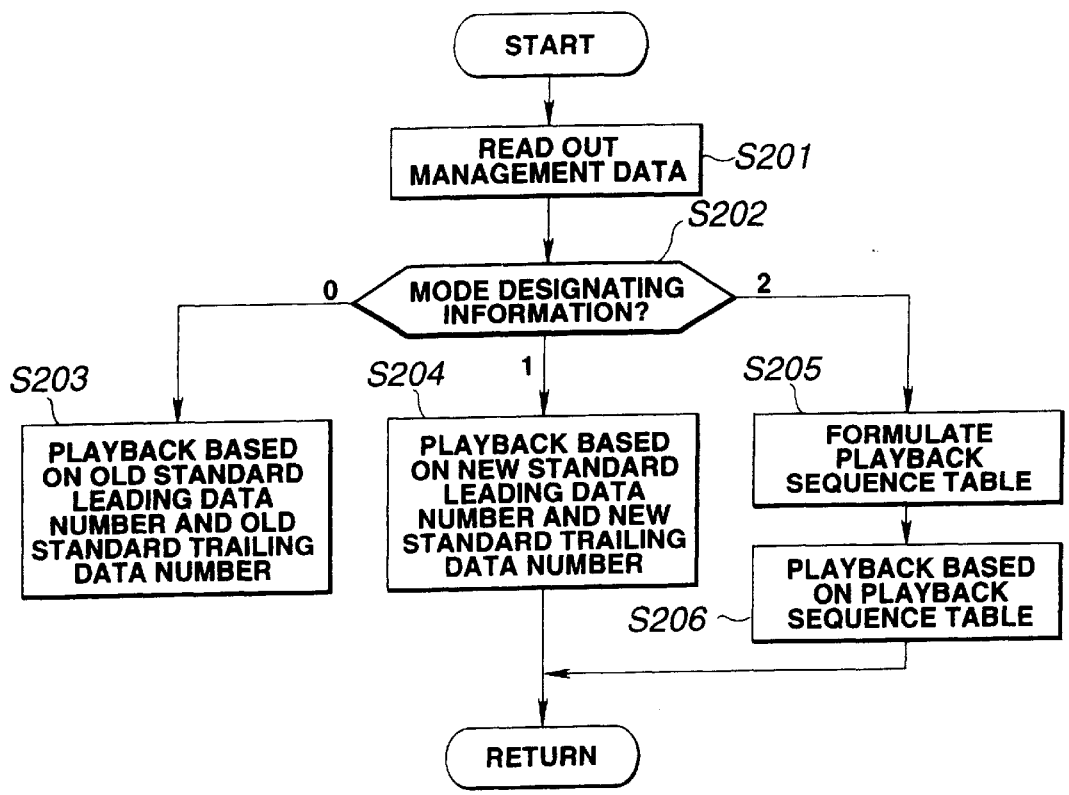
FIG. 14 is a flowchart showing the processing flow of data reproduction in a recording/reproducing device designed to cope with the new standard for implementing the second illustrative structure of the present invention.

In FIG. 14, the system controller 57 reads out data recorded in the management data area from the disc at step S201. The system controller 57 decides at step S202 which of the above values 0, 1 or 2 is assumed by the value of the mode designating information recorded in the management data area. If the value of the mode designating information is 0, the system controller 57 transfers to step S203 and, if the value of the mode designating information is 1, the system controller 57 transfers to step S204. If the value of the mode designating information is 2, the system controller 57 transfers to step S205.

At the step S203 for the value 0 of the mode designating information, reproduction is made on the basis of the leading data number and the trailing data number of the old standard. At the step S204 for the value 1 of the mode designating information, reproduction is made on the basis of the leading data number and the trailing data number of the new standard.

Figure 15:
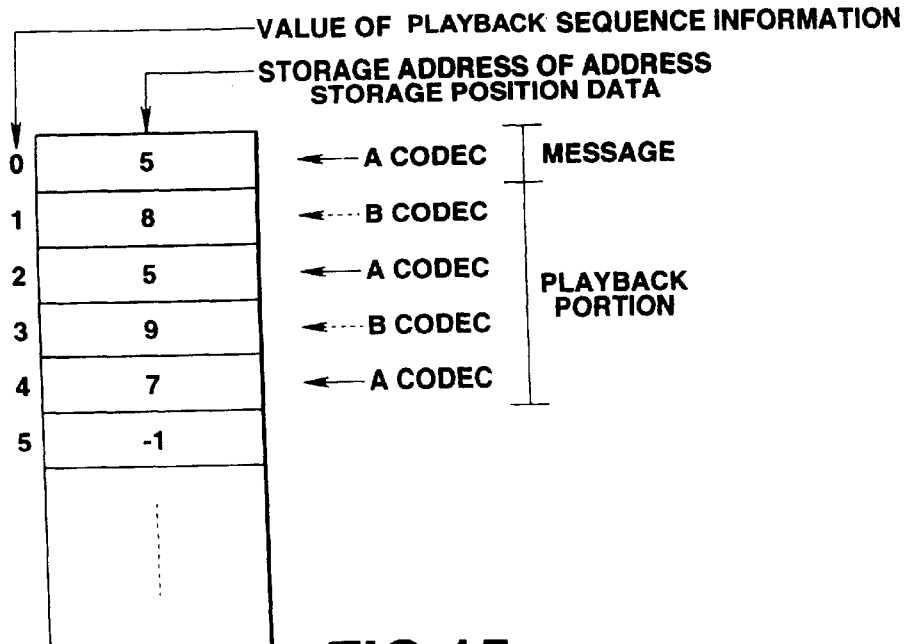
FIG. 15 shows t playback sequence table used in the second illustrative structure of the present invention.

At steps S205 ff for the value 2 of the mode designating information, the audio signal data by the A-codec and the audio signal data by the B-codec are reproduced in the sequence designated by the reproducing sequence information. The processing of the steps S205ff. are carried out as follows: First, at step S205, the playback sequence table is constructed in a memory in the system controller 57 which then proceeds to reproduction at step S206. The playback sequence table is constructed by the values of the playback sequence information and the address storage positions associated with each other, as shown in FIG. 15. That is, the system controller 57 scans the data of the address storage positions based on the leading data number of the old standard, trailing data number of the old standard, leading data number of the new standard and the trailing data number of the new standard, at the same time as it reads out the playback sequence information ancillary to the address information determined by the data of the address storage position, in order to construct the playback sequence table comprised of the playback sequence information and the address storage positions associated with each other, as shown in FIG. 15. At the step S206 in FIG. 14, it suffices to reproduce the audio signal data associated with the first data ff of the playback sequence table in regular order. In FIG. 15, the value −1 recorded in an address 5 of the playback sequence table denotes the end of table. In this manner, with the recording/reproducing device for the new standard, the audio signals encoded by the A-codec and the audio signals encoded by the B-codec, recorded in a mixed state on a disc, can be re-arrayed in an optional sequence as desired by the user and reproduced.

In the above-described first and second illustrative examples, a costly ROM 80 as shown in FIG. 4 needs to be used in a recording/reproducing device adapted for coping with the new standard. On the other hand, in the first and second illustrative examples, it cannot be recognized, in reproducing the disc by the reproducing device adapted for coping with the old standard, which of the audio signal data recorded on the disc cannot be reproduced except by the recording/reproducing device adapted for coping with the new standard. In a third illustrative example, now explained, it becomes unnecessary to use the ROM 80, while the reproducing device adapted for coping with the old standard can recognize which of the audio signal data recorded on the disc cannot be reproduced except by the recording/reproducing device adapted for coping with the new standard.

That is, with the third illustrative example of the present invention, message signals encoded by the A-codec are previously recorded on the disc. That is, the message signals have been recorded on the disc from the outset. When performing recording by the B-codec in the recording/reproducing device adapted for coping with the new standard, the contents of the management data recorded in the management data area as the occasion may demand are acted on, that is, the addresses in which the address information has been recorded is rewritten, so that, when doing reproduction by the reproducing device adapted for coping with the old standard, the pre-recorded message signals are re-written in order to render it possible to use a less costly recording/reproducing device not having a ROM as shown in FIG. 4.

Also, in the third illustrative example of the present invention, the above message signals are associated with respective audio signal data supplied with the recording position information (address storage position and the address information) by the management data, and the message signals are adapted to be reproducible even by the reproducing device adapted for coping with the old standard, in order for the user of the reproducing device adapted for coping with the old standard to be apprized of which of the audio signal data recorded on the disc have actually been encoded by the B-codec.

The third illustrative example of the present invention is hereinafter explained.

Figure 16:
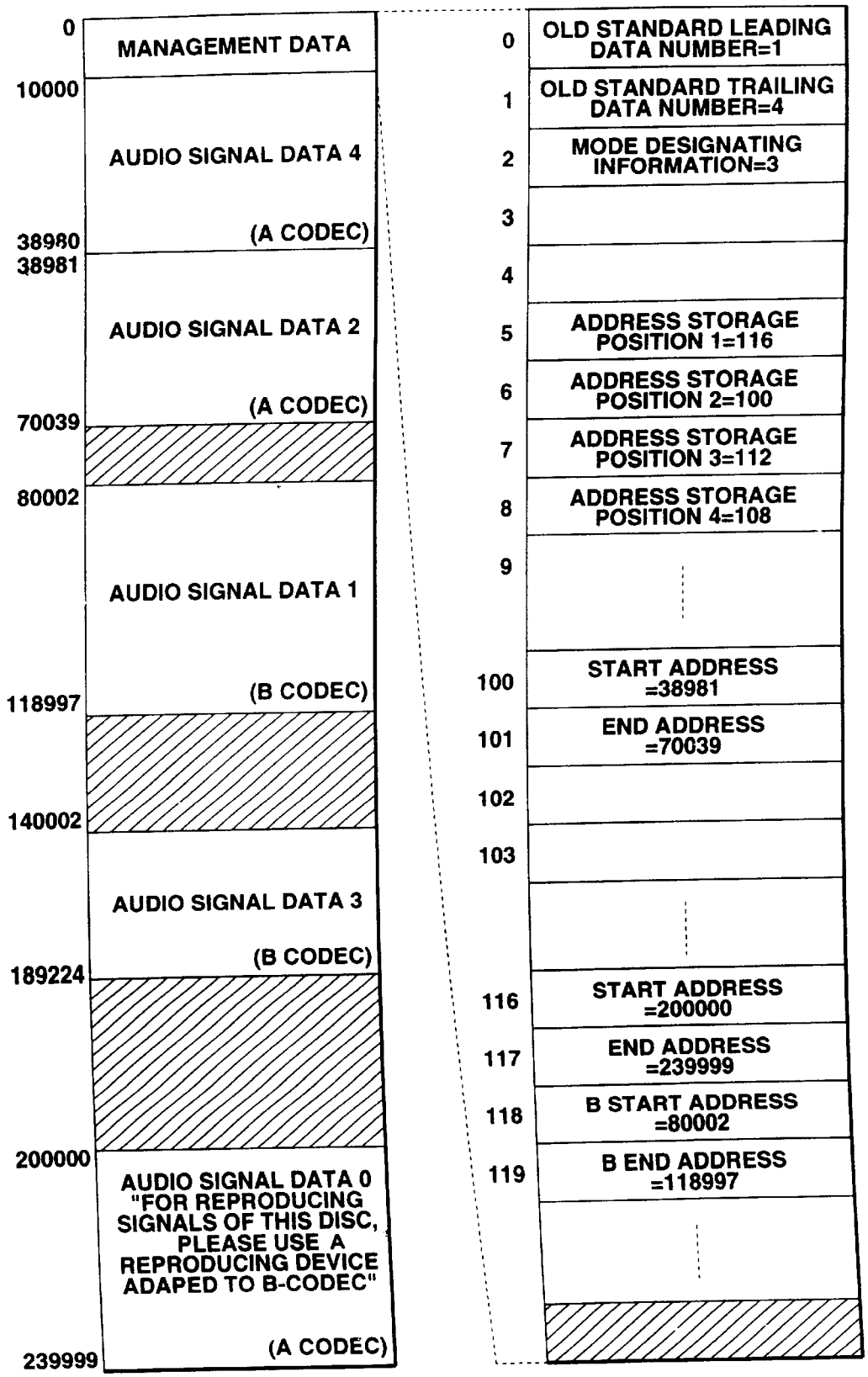
FIG. 16 illustrates a format according to a third illustrative structure of the present invention.

FIG. 16 shows the format in case the audio signal data by the A-codec and the audio signal data by the B-codec have been recorded on a disc on which the message signals have been recorded from the outset.

In FIG. 16, the audio signal data 4 and the audio signal data 2 have been encoded by the A-codec, while the audio signal data 1 and the audio signal data 3 have been encoded by the B-codec. In the example of FIG. 16a message signal by the A-codec is pre-recorded as an audio signal represented by audio signal data 0. This pre-recorded message signal reads: "Please use a reproducing device adapted for coping with the B-codec for reproducing this music number."

In an address 0 and an address 1 of the management data area, there are recorded the leading data number and the trailing data number of the old standard. In the example of FIG. 6, the value of the leading data number of the old standard is 1, while the value of the trailing data number of the old standard is 4. This indicates that it is four audio signals of first and fourth audio signals that can be taken out as the old standard from the disc.

In the address 2 of the management data area is recorded the value of 3 as the mode designating information. The values 0, 1 or 2 of the mode designating information specify that the recording is made by the old standard, recording is made so that the reproducing device of the old standard reproduces only the message signals, or that the address storage positions of the audio signals by the A-codec and the address storage positions of the audio signals by the B-codec have been recorded collectively in separation from each other, respectively. The value 3 of the mode designating information specifies that the message signal by the A-codec is recorded in addresses 200000 ff. If the value of the mode designating information is 3, nothing is recorded in the addresses 3 or 4 of the management data area.

In the addresses five to eight of the management data area is recorded the information on the address storage positions, as in FIGS. 11 or 12. In the example of FIG. 16, addresses 116, 100, 112 and 108 are recorded as storage positions of the address information for audio signal data reproduced first, second, third and fourth, respectively. Of course, the contents of the address storage positions can be interchanged in the case of FIG. 16.

In the example of FIG. 16, in the address information designated by the address storage area, the address information stored in the address 116 specified by the address storage position 1 of the address 5 has the start address and the end address of 200000 and 239999, respectively.

The address information stored in the address 100 specified by the address storage position 2 of the address 6 has the start address and the end address of 38981 and 70039, respectively. Also, in the example of FIG. 16, the address information for the audio signal data by the B-codec is recorded in the addresses 118ff such that, for example, the start address and the end address by the B-codec are recorded in the addresses 118 and 119, respectively.

Specifically, the third illustrative example shown in FIG. 16 differs from the first and second illustrative examples in that a speech signal running: "Please use a reproducing device adapted for coping with the B-codec for reproducing this music number." is recorded as the message signal, the value of the mode designating information recorded in the address 2, among the management data recorded in the management data area, is 3, and that, for recording a signal encoded by the B-codec, the start address and the end address are recorded next to the start address and the end address of the message signal encoded by the A-codec.

Figure 17:
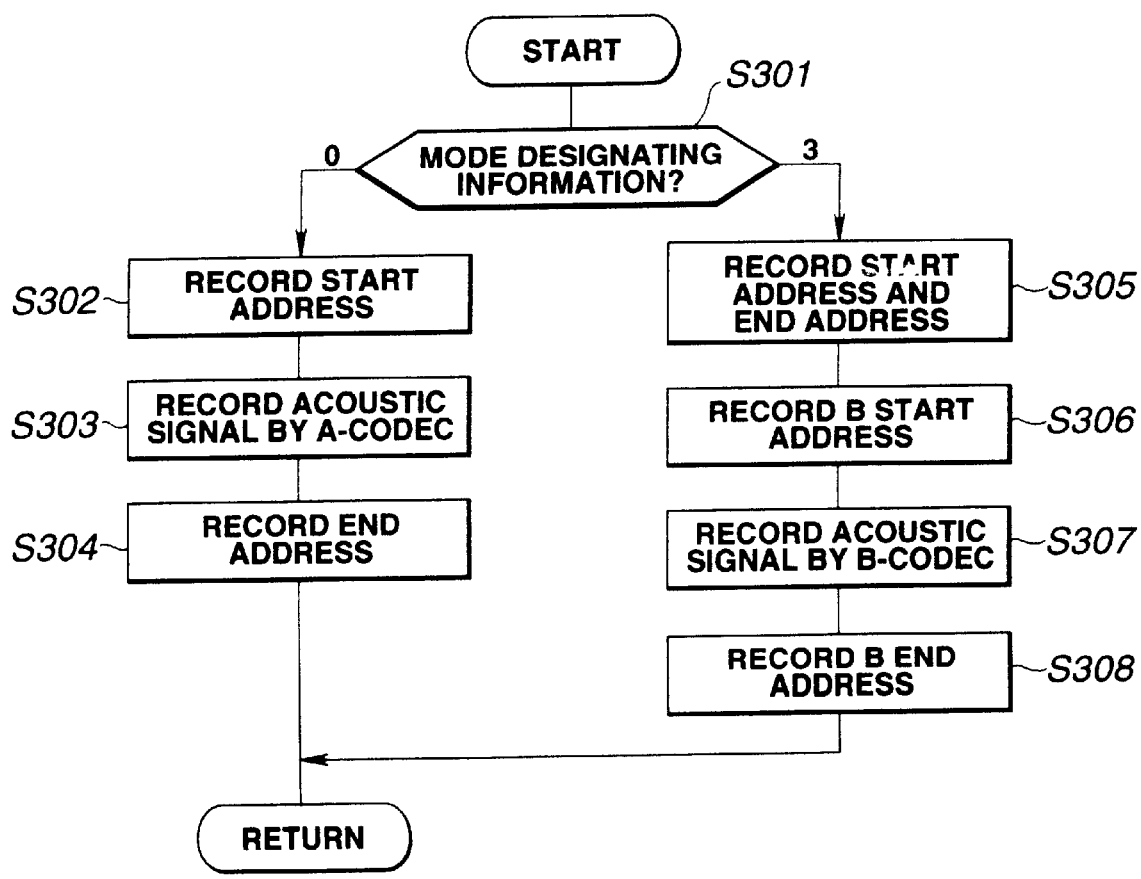
FIG. 17 is a flowchart showing the processing flow of data recording in a recording device designed to cope with the new standard for implementing the third illustrative structure of the present invention.

FIG. 17 shows a processing example in the system controller 57 of the recording device adapted for coping with the new standard when recording the disc in accordance with the format of the third illustrative example shown in FIG. 16. That is, the recording device adapted for coping with the new standard enables recording in the A-codec shown in FIG. 16, with the value of the mode designating information being then zero, while also enabling the recording in the B-codec, explained in connection with the third illustrative example, with the value of the mode designating information being then three.

Referring to FIG. 17, the mode designating information entered by the user of the recording device associated with the new standard is checked at step S301. If the value is 0, processing transfers to step S302. At this step S302, the start address for audio signal data by the A-codec is recorded, as shown in FIG. 16. At the next step S303, the audio signal data (that is, acoustic signal) encoded by the A-codec is recorded. Subsequently, at step S304, the end address is recorded.

If, at step S301, the value of the mode designating information is found to be 3, processing transfers to step S305. At this step S305, a start address and an end address for the message signal are first recorded. At the next step S306, a start address (B-start address) for audio signal data (acoustic signals) encoded by the B-codec is recorded. At the next step S308, an end address of the B-codec (B end address) is recorded.

In this manner, if the value of the mode designation information is found to be 3, the address information for the message signal by the A-codec is necessarily recorded, after which the address signal for the audio signal data by the B-codec and the audio signal data by the B-codec are recorded. This specifies that, if subsequently the audio signal data by the B-codec is reproduced, the address information for the message signal is necessarily read out before reproduction of the audio signal data by the B-codec. Therefore, if, in reproducing the disc by, for example, the reproducing device adapted for coping with the old standard, an area having recorded therein the audio signal data by the B-codec is reproduced, the above message signal is necessarily reproduced. Of course, with the reproducing device adapted for coping with the old standard, only the message signal is reproduced, while the audio signal data by the B-codec is not reproduced.

When reproducing the disc recorded as in the third illustrative example shown in FIG. 16 by the reproducing device adapted for coping with the old standard, the leading data number of the old standard and the trailing data number of the old standard, recorded in the addresses 0 and 1 of FIG. 16, are first read out. Thus the reproducing device adapted for coping with the old standard understands that the four audio signal data, that is the first to fourth audio signal data, can be reproduced from the disc.

Then, in order to be apprized where audio signal data, reproduced as the first to four data, are recorded on the disc, the reproducing device adapted for coping with the old standard checks the contents of the address storage positions of from the address 5 to 8 associated with the first to fourth audio signal data to be reproduced.

Thus the reproducing device adapted for coping with the old standard checks the contents of the address storage positions of the addresses 5 to 8 in accordance with the old standard in order to be apprized of the addresses where the address information specified by the address storage positions have been recorded. The reproducing device adapted for coping with the old standard then takes in the start address and the end address of audio signal data to be reproduced from the addresses 116, 100, 112 and 108 read out from the address storage positions of the addresses 5 to 8.

The start address and the end address, recorded in the addresses 116ff, specify the addresses 200000 to 239999, as explained previously. In these addresses are pre-recorded the message signals as the audio signal data 0. Thus the reproducing device adapted for coping with the old standard reproduces the contents of the audio signal data 0 depending on the address information associated with the address storage position of the address 5 for reproducing the message reading: "Please use a device adapted for coping with the B-codec for reproducing this musical number". On the other hand, if it is attempted to reproduce audio signal data by the reproducing device adapted for coping with the old standard, only the above message signal is reproduced.

For reproduction by the reproducing device adapted for coping with the old standard, by recording by the format of the third illustrative example, as shown in FIG. 16, it becomes possible to use an inexpensive recording/reproducing device which is not provided with a ROM, capable of reproducing the pre-recorded message signals and which is adapted for coping with the new standard. In addition, in the third illustrative example of the present invention, it is possible with the reproducing device adapted for coping with the old standard to be apprized which of the audio signal data recorded on the disc cannot be reproduced except by the reproducing device adapted for coping with the new standard and to let the user be informed of that effect.

The processing flow in case the disc recorded in accordance with the format of the third illustrative example shown in FIG. 16 by the reproducing device adapted for coping with the new standard is as follows:

The recording/reproducing device adapted for coping with the new standard first checks the contents of the mode designating information recorded in the address 2. Since the mode designating information recorded in the address 2 is 3 in the example of FIG. 16, the reproducing device adapted for coping with the new standard is apprized of the fact that the message signal by the A codec has been recorded in the addresses 200000ff of the disc, and first reads out the information on the address storage position.

The recording/reproducing device adapted for coping with the new standard first reads out the information on the address storage position and then reads out the start address based on the read-out address storage position information. Since the start address is the address 200000 ff, the recording/reproducing device adapted for coping with the new standard is apprized of the fac that this corresponds to the message signal and that the address information of each audio signal data recorded by the B-codec is recorded next to the address information of the massage signal. Thus the recording/reproducing device reproduces the audio signal data recorded by the B-codec instead of the message signal. Since the same data (audio signal data 0) can be used as the message signal encoded by the A-codec for the audio signal data encoded by the B-codec, the high utilization efficiency of the recording medium can be realized.

Figure 18:
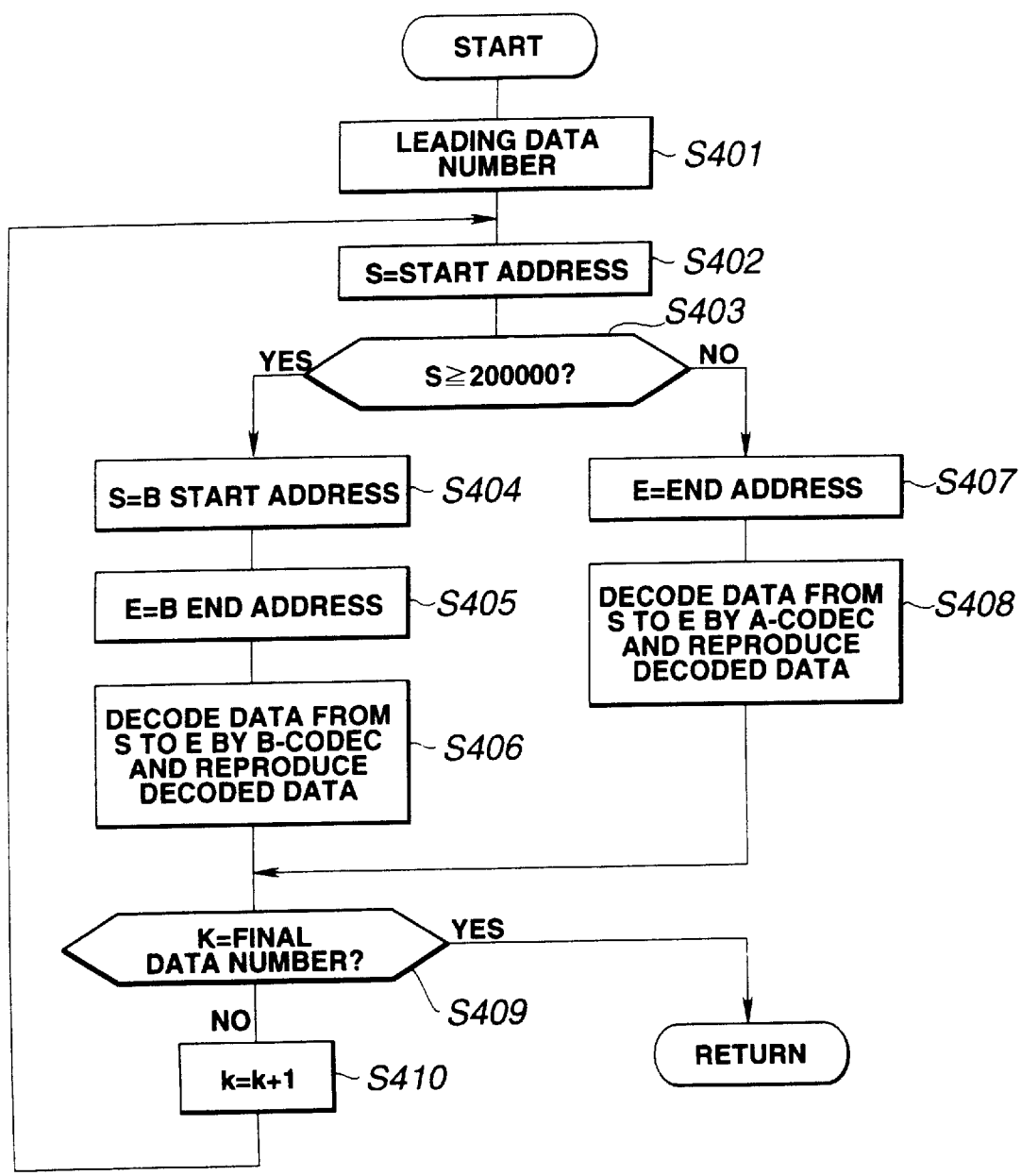
FIG. 18 is a flowchart showing the processing flow of data reproduction in a recording/reproducing device designed to cope with the new standard for implementing the third illustrative structure of the present invention.

FIG. 18 shows a processing example of a reproducing device adapted for coping with the new standard for reproducing the recording medium of the format of the third illustrative example shown in FIG. 16.

In FIG. 18, a leading data number recorded in the management data portion is substituted at step S401 for a value of a variable k. At the next step S402, a start address for the above audio signal data read out in association with the above variable k is substituted for the variable S. At the next step S403, the value of the variable S is checked.

At this step S403, if the value of the variable S is not less than 200000, the audio signal data downstream of this address is a message signal. Therefore, processing transfers to step S404 to change the value of the variable S to a start address of the B-codec (B start address). At the next step S405, the value of the variable E is set as an end address of the B-codec (B end address). At the next step S406, data from the start address to the end address, specified as a value from the variable S to the variable E, is decoded and reproduced by the B-codec, before processing transfers to step S409.

At the step S409, processing comes to a close if the value of the variable k is the trailing data number. If otherwise, processing transfers to step S410 to increment the value of the variable k by one. Then, processing transfers to step S402 to repeat the processing.

The structure of the recording/reproducing device for implementing this third illustrative example corresponds to the structure of FIG. 4 less the ROM 80. The operation of the system controller 57 of the recording/reproducing device of the third illustrative example implements the flowchart of FIGS. 17 or 18.

In the above-described third illustrative example, message signals encoded by the A-codec are pre-recorded on a disc. For recording by the B-codec in a recording device adapted for coping with the new standard, the contents of the management data recorded in the management data area is acted upon, that is the address in which the address information has been recorded is rewritten, if necessary, and the message signals are recorded in association with each audio signal data to which the recording position information, that is the address information, is accorded by the management data, whereby the message signals can be reproduced by the reproducing device adapted for coping with the old standard. On the other hand, if it is attempted to reproduce the audio signal data by the B-codec by the reproducing device adapted for coping with the old standard, the message signals are reproduced, thus allowing the user of the reproducing device adapted for coping with the old standard to be informed for which of the signals recorded on the disc a reproducing device adapted for coping with the new standard is necessitated.

In the above-described third illustrative example, acting on the contents of the management data recorded in the management data area if necessary for recording by the B-codec in a recording device adapted for coping with the new standard may be done independently of or simultaneously with associating the message signals with each audio signal data to which the recording position information is accorded by the management data. In the latter case, the recording device adapted for coping with the new standard may be simplified further in structure.

In the above-described third illustrative example, the message signals are pre-recorded on the disc. However, as in the above-described first and second illustrative examples, the audio signal data by the B-codec and the message signals by the A-codec associated with the audio signal data may be recorded in their entirety on the real-time basis. However, in this case, the recording time for recording the message signals becomes necessary such that it becomes necessary to use a hardware structure in which the audio signal data and the message signals can be recorded at a high speed on the disc on the real-time basis.

This becomes possible by providing a buffer capable of storing both the message signals and the audio signal data by the B-codec prior to writing on the disc and by writing the data stored in the buffer at a speed twice the real-time speed. However, the recording device adapted for coping with the new standard is raised in cost due to provision of the buffer. The message signal by the A-codec can be recorded at a time point of termination of all recording of the audio signal data by the B-codec. However, supposing that a 10-second message signal is written on the real-time basis, the power source for the recording device needs to be in operation for further ten seconds for writing the message signal after the end of recording by the B-codec. The user is kept waiting during this time. If the message signal is pre-recorded, as in the thirds illustrative example, it is unnecessary to record associated message signals when recording audio signals data by the B-codec, but it is only necessary to record the address information. Thus, if the address information is recorded on the disc after the end of the recording of all of the audio signal data, processing may be terminated in an extremely short time, thus affecting the operability of the device only to a small extent. In addition, since the buffer for high-speed writing is unnecessary, the recording device is not raised in cost.

Although audio signals are used in the above description, the information encoding method according to the present invention can be applied to a case in which the signals reproduced by the reproducing device are video signals or the textual information including the code information for speech synthesis. The information encoding method according to the present invention can also be applied to a case in which the signals by the new standard are not identical with those of the old standard. For example, the information encoding method according to the present invention can be applied to a case in which computer data are recorded in the new standard on an information recording medium on which audio signals are designed to be recorded by the old standard. In either cases, a message indicating the use state of the information recording medium is encoded and recorded as a signal capable of being reproduced by the old standard for preventing the dismay otherwise caused to the user.

Although the above description is directed to recording an encoded bitstream on an information recording medium, the present invention may be applied to transmission of a bitstream for preventing a reproducing device constructed in accordance with the old standard from outputting an erroneous playback signal on reception of a bitstream encoded in accordance with the new standard.

According to the present invention, as described above, it becomes possible to prevent the user of reproducing means adapted for coping only with the first encoding method from being distressed if the or she has attempted to reproduce an information recording medium on which signals have been recorded in accordance with the second encoding method (new standard) and hence to smoothly introduce the second encoding method (new standard).

According to the present invention, it also becomes possible to inexpensively construct recording means recording means adapted for coping with the second encoding method (new standard) capable of reproducing a message signal if reproduction is done by reproducing means adapted for coping with the first encoding method (old standard).

According to the present invention, it also becomes possible for a user of reproducing means adapted for coping only with the first encoding method (old standard) to learn which number signal can be reproduced solely by reproducing means adapted for coping only with the second encoding method (new standard).

What is claimed is:

1. An information decoding apparatus, comprising:
  a discrimination circuit configured to detect the existence of user message data encoded in accordance with a first encoding method;
  a reproducing circuit for selecting and decoding information data encoded in accordance with a second encoding method and which cannot be reproduced by a reproducing circuit adapted for coping only with the first encoding method based on management information including an arraying position of the user message data; and
  a display unit configured to display at least a portion of said user message data.

2. The apparatus of claim 1 wherein said management information includes a rule of associating the arraying position of the user message data with plural items of the information data.

3. The apparatus of claim 1 wherein said reproducing circuit selects the information encoded in accordance with the second encoding method based on the arraying position taken out from said management information.

4. An information decoding method, comprising the steps of:

detecting the existence of user message data encoded in accordance with a first encoding method;

selecting and decoding information data encoded in accordance with a second encoding method and which cannot be reproduced by a reproducing circuit adapted for coping only with the first encoding method based on management information including an arraying position of the user message data; and displaying at least a portion of said user message data.

5. The method of claim 4 wherein said management information includes a rule of associating the arraying position of the user message data with plural items of the information data.

6. The method of claim 4 wherein said step of selecting and decoding includes the step of selecting the information encoded in accordance with the second encoding method based on the arraying position taken out from said management information.

* * * * *